March 17, 1964  F. W. McLARTY  3,124,920
COTTON HARVESTING MACHINES

Filed Nov. 17, 1958   6 Sheets-Sheet 1

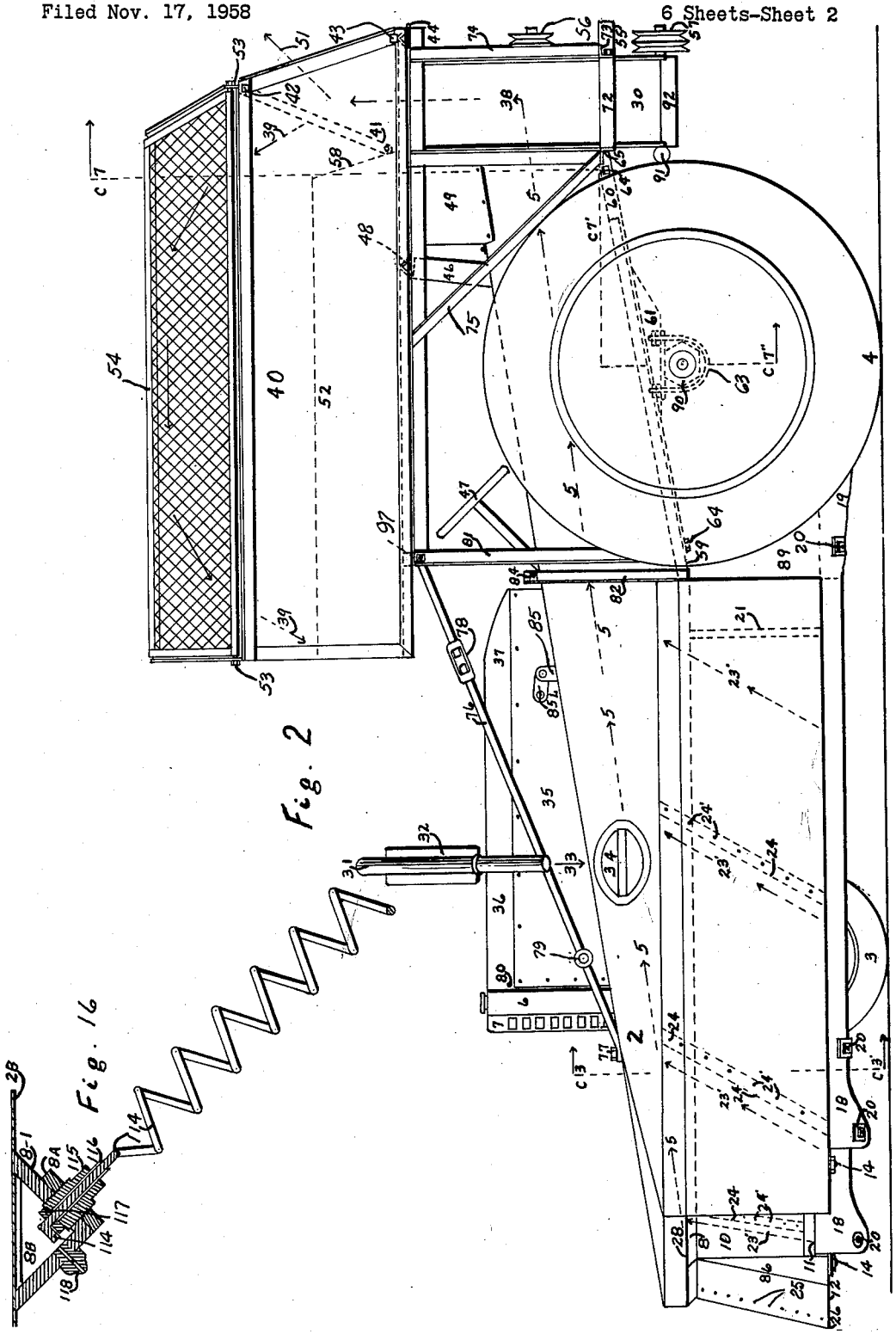

March 17, 1964 F. W. McLARTY 3,124,920
COTTON HARVESTING MACHINES
Filed Nov. 17, 1958 6 Sheets-Sheet 3

March 17, 1964  F. W. McLARTY  3,124,920
COTTON HARVESTING MACHINES
Filed Nov. 17, 1958  6 Sheets-Sheet 5
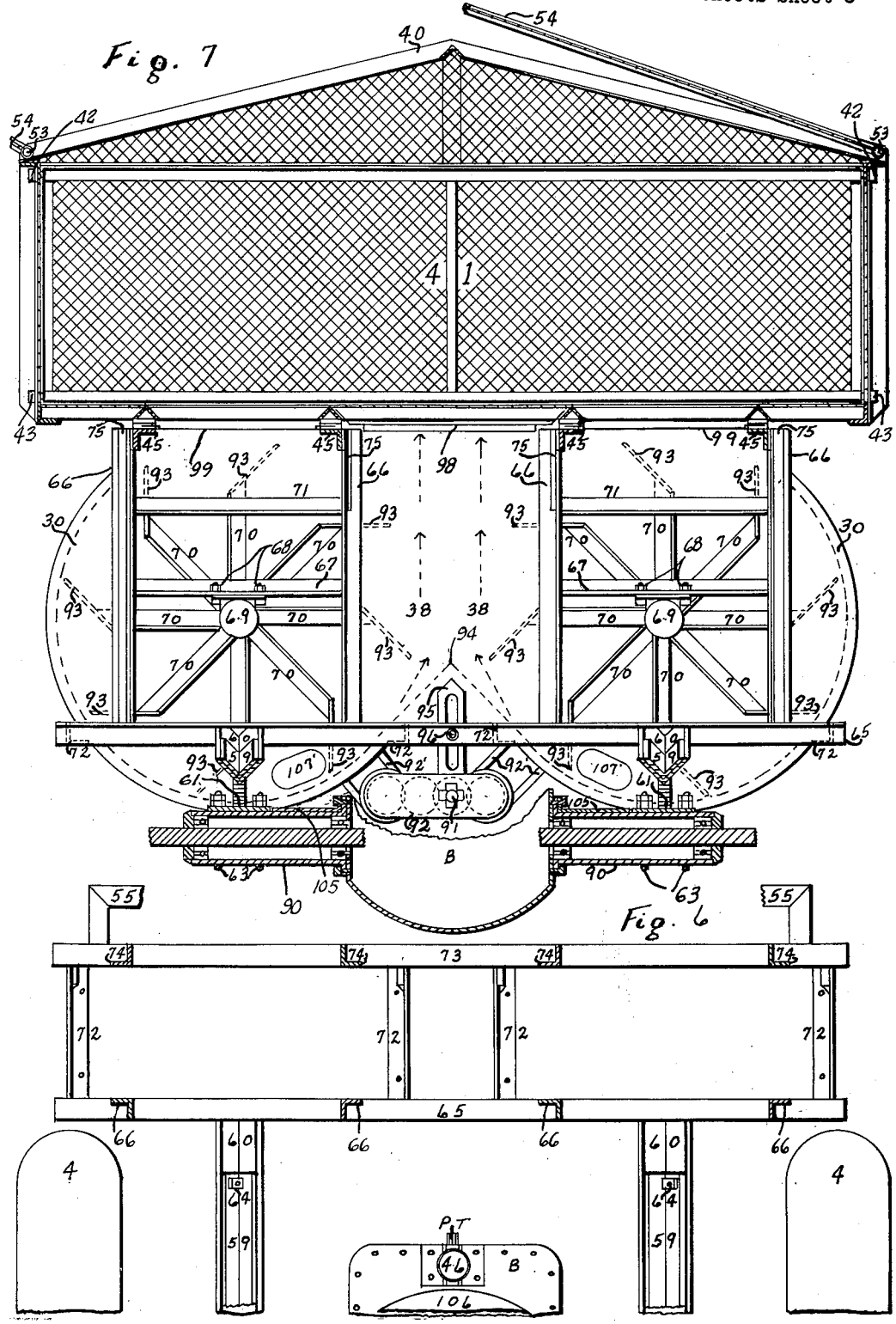

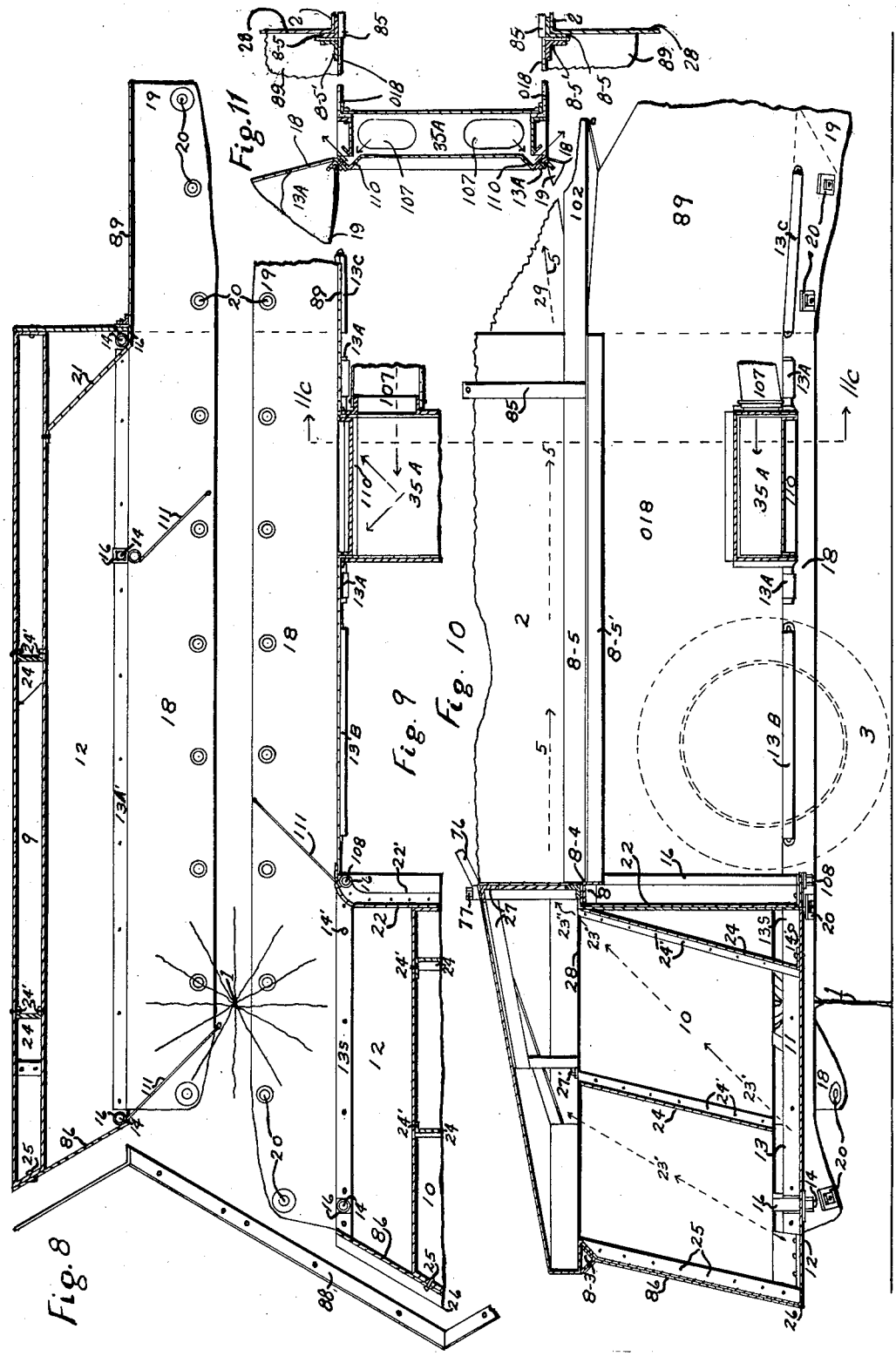

United States Patent Office 3,124,920
Patented Mar. 17, 1964

3,124,920
COTTON HARVESTING MACHINES
Frank W. McLarty, 337 S. Edgefield Ave., Dallas 8, Tex.
Filed Nov. 17, 1958, Ser. No. 774,410
14 Claims. (Cl. 56—12)

This invention relates to new and useful improvements in cotton harvesting machines.

A primary object of the invention is to provide a cotton harvesting machine with few working parts that primarily will utilize suction simultaneously to remove the seed-cotton from the burrs and to transport it to a basket or container, from which it may be removed easily for storage in a curing loft or for hauling to a gin.

A special feature in this connection is that (because of unique air suction conduit inlets from the slotted suction chambers) the weight of the seed-cotton is utilized to aid the air flow in transporting the seed-cotton from the burrs and through any limbs or foliage of the cotton plants to the inlets of the restricted conduits by which it will be carried with the air to the air suction fan and seed-cotton retaining basket.

Another special feature consists of means of utilizing the heat of the engine and exhaust gases of the tractor on which the harvesting mechanism may be mounted to heat the air in which the seed-cotton travels and thus dehydrate the cotton to some extent, particularly if there be any dew in the cotton being harvested at night.

A particular feature is provision of a means of diverting the seed-cotton from the basket through the same suction fans for a second aerating of the seed-cotton while transferring it to a loft for drying or into a truck for hauling to a gin.

An important object is to provide a harvesting machine that under some circumstances will operate in harvesting cotton prior to frost without the necessity of defoliating the cotton stalks and without injury to unmatured bolls, which may be harvested later at maturity or after frost.

A coordinate object is to provide individually flexible fingers that will aid an air suction in separating seed-cotton from the burrs of cotton bolls without abuse of the cotton plant and without stripping immature bolls therefrom.

Other special features, such as the means for modifying the height at which the manifold suction hood travels down the cotton plant rows to accommodate cotton stalks of varying height, as well as means for automatic adaptation to rows of slightly differing width, will be understood more readily from a reading of the following exposition or specification in conjunction with the attached drawings, in which the parts are numbered to correspond, and in which:

FIG. 2 is a side elevation of the machine shown in FIG. 1 in reduced scale, the other side being symmetrical.

FIG. 3 is a fragmentary cross section showing substantially the right half of the machine in FIGS. 1 and 2 in a plane perpendicular to the longitudinal axis at line C3—C3′ of FIG. 2 with slight modification of longitudinal horizontal frames supporting pans astride the cotton stalk row.

Figure 1:
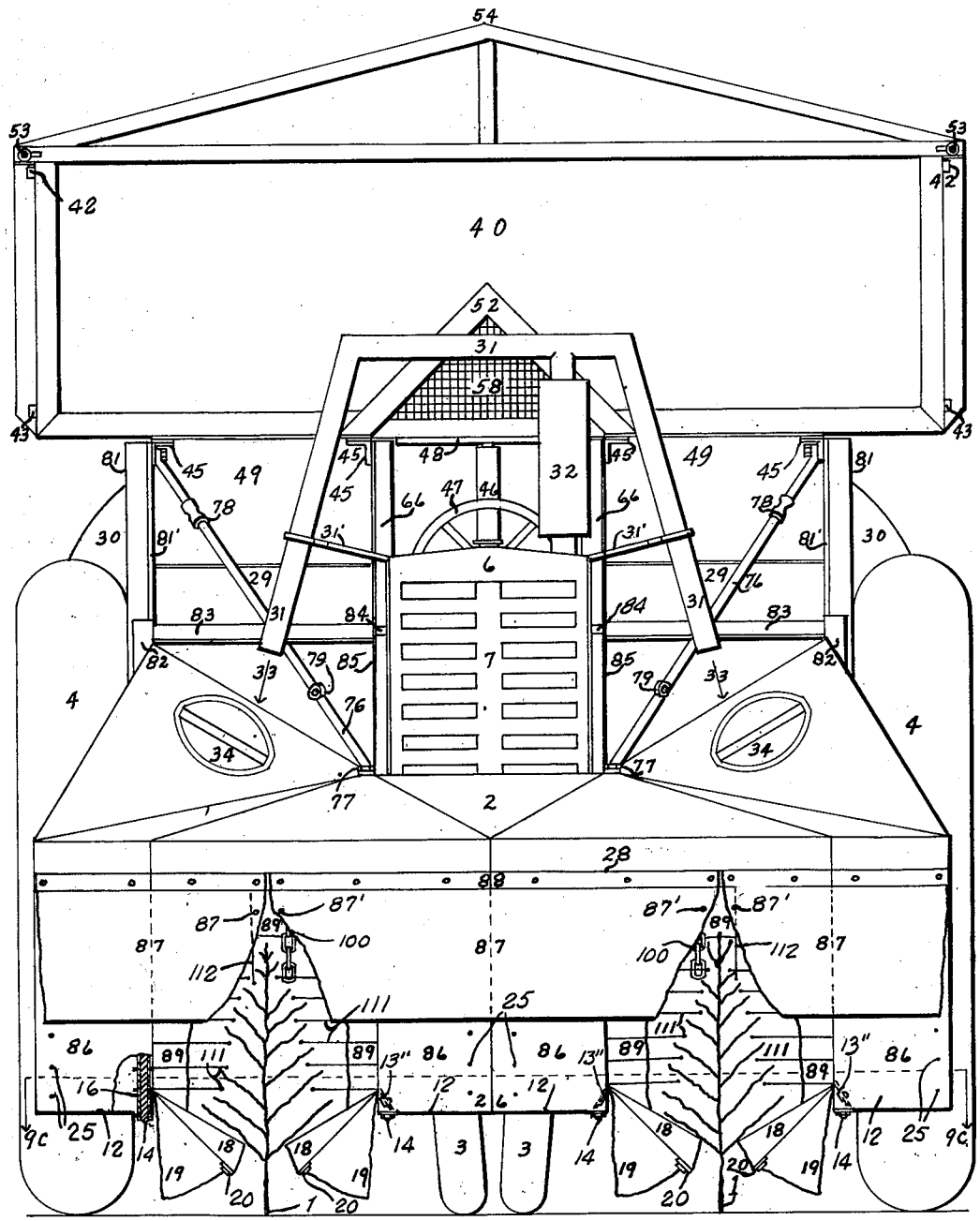
FIGURE 1 is a frontal elevation of a preferred embodiment of the invention.

FIG. 4 is a fragmentary frontal view of the same machine shown in part in FIG. 3 with front curtains shown in FIG. 1 removed to show air restricting plates extending inward toward plant rows from conduits in the middles between plants and other features. FIG. 3 is separated from FIG. 4 by the very slightly waving line 9C—10C that extends vertically through the longitudinal axis of the tractor and harvester.

Figure 5:
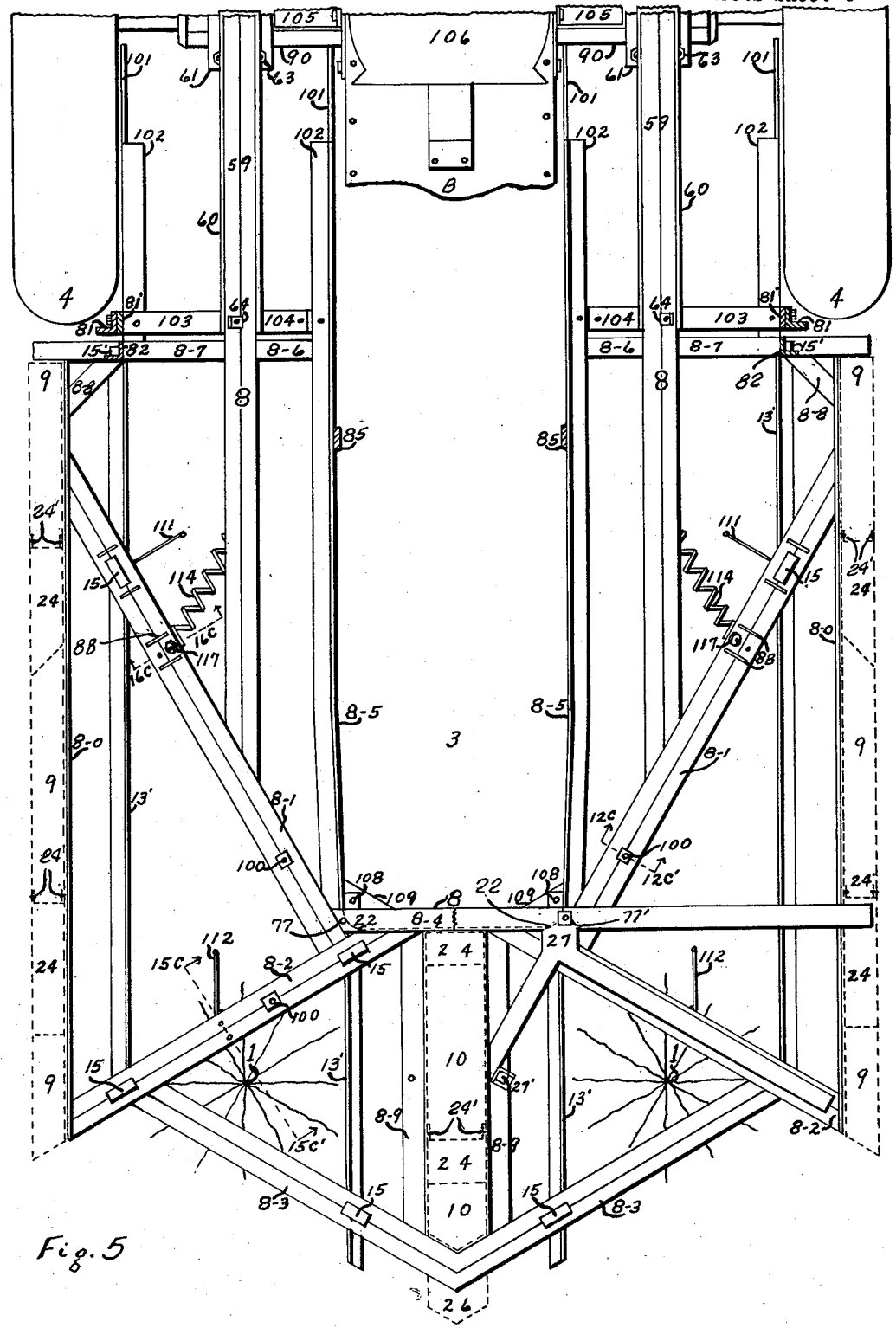

FIG. 5 is a fragmentary plan view of the front framework carried beneath the ceilings of paired suction chambers around the front of the tractor body and attached to a central framework mounted pivotally on the rear axle housing of a conventional row-crop tractor at each side of said body.

FIG. 6 is a plan elevation showing the rear portion of the framework shown in FIG. 5 rearward of the tractor axle housing for mounting fan cases that counterbalance the front suction chambers on the lateral pivotal axis.

FIG. 7 is a vertical lateral cross section of the machine of FIG. 2 at planes indicated by offsetting lines C7—C7′ and C7′—C7″.

FIG. 8 is a fragmentary plan view of the diagonally offset strap member supporting the diagonally disposed curtains shown in FIG. 1.

FIG. 9 is a fragmentary horizontal cross section at line 9C—9C′ of FIG. 1 showing the left half of a conduit closure beneath the tractor body, whereby air is introduced under pressure from fans at the rear of the tractor into the suction chambers.

FIG. 10 is a fragmentary vertical cross section along the longitudinal axis of the tractor and through the waving line 9C—10C between FIGS. 3 and 4 and through an air conduit at front of tractor shown in FIG. 9.

FIG. 11 is a fragmentary vertical cross section through the pressure conduit closure indicated by line 11C—11C′ in FIGS. 9 and 10.

FIG. 12 is a vertical cross section through the frame member 8–1 shown in FIG. 5 at line C12—C12′ showing detail fragment of chain suspended as obstruction in suction chamber carried by frame.

FIG. 13 is a detail cross section showing mounting of the rear flexible finger 11 shown in FIG. 9 at the left of the space provided in the suction chamber for passage of cotton stalks.

FIG. 14 is a detail cross section showing mounting for the front flexible finger 111 shown at left of FIG. 9.

FIG. 15 is a fragmentary vertical detail cross section through the horizontal frame member 8—2 at line 15C—15C′ of FIG. 5 showing spring finger with ball on end thereof for agitating cotton plants from above in the suction chamber.

FIG. 16 is a vertical detail cross section through frame member 8-1 of FIG. 5 at line 16C—16C′ and through the straight section of a coiled spring rotatable in a bearing mounted in the frame.

Although some of the features hereof have other possible adaptations, the present invention is intended primarily as a pneumatic harvesting mechanism that is adaptable to installation on a conventional "tricycle" row-crop tractor without any necessary modification of such tractor designed for other purposes such as cultivation of row crops. Accordingly the tractor shown in the drawings, on which an embodiment of the invention has been mounted, has a long slender body, beneath the front portion of which is a steering truck having dual wheels with pneumatic tires 3, that travel in the "middle" between the two adjacent rows 1 of the crop such as cotton being harvested by air suction from the hollow polyhedron box (in the general form of a horizontal U around the front end of the tractor body B) that serves as a manifold suction hood 2, whose lower surface 28 above the plant rows 1 here serves as the ceiling of two partly closed vacuum chambers astride each of the plant rows shown in FIG. 1. The large pneumatic tires 4 of the rear drive wheels of the tractor are spaced apart by twice the distance between two adjacent rows to travel in the "middles" astride the two adjacent rows being harvested; and these two rear drive wheels are shown in FIG. 5 as being mounted on axles that extend outward from their housings 90 that are bolted to the sides of the rear portion of the tractor body B, although different tractors have different means of mounting their rear drive wheels, just as their front steering wheels.

All such tractors, however, appear to have their conventional power-take-off shafts located at the rear center line of the tractor body, although some of them are slightly above and others are slightly below the level of the rear axle. And it is a significant feature of the present invention that I have shown (FIGS. 1 and 2) a means of mounting a pair of very large rotating suction fans at the rear of the tractor, where (mounted in a dual fan case 30) they are in position for direct conduit communication (through slightly ascending parallel conduits 29) with the rear segments of the manifold suction hood 2 at the front of the tractor, and for use with a unique driving means, in flexible connection with the tractor power-take-off shaft at the rear, that in no way conflicts with the optimum placement of suitable conduits leading from the fans to a unique seed-cotton retaining basket above the operator's head, so that the harvesting machine on the tractor may pass over the cotton rows more than once without appreciable injury to the plants, in order to harvest the cotton as it matures on the stalks.

FIG. 3, which (in conjunction with FIG. 4) shows one half of the manifold suction hood 2 and the suction chambers beneath it cut away to a vertical lateral plane about six inches forward of the guard grill 7 of the tractor radiator 6, illustrates some of the essential features of the present invention. The sharply curving arrows 5 in FIG. 3 indicate that at these points the air in the manifold suction hood 2, which has been sucked out of the semi-closed suction chambers beneath it, is beginning to travel rearward in the manifold hood 2 on each side of the tractor body to pass through the upward sloping conduits 29 (between the rear tires 4) and thence directly into the inlets (above the two cotton rows) of the dual fan housing 30, whose forward face is approximately perpendicular to the longitudinal axis of the tractor. The manifold suction hood 2 (although manufactured separately for convenience) might be considered as a flattened forward extension of the air suction conduits 29 around the front of the tractor body B, that is approximately twice the width between two adjacent rows, and that therefore extends over the two rows being harvested and out over the "middles" ahead of the rear tractor tires 4 as well as over the "middle" ahead of the front tires 3. In the foregoing sense the manifold suction hood 2 is an amalgamation of the flattened forward extension of the suction conduits 29, although the two air streams to the inlets of dual fan case 30 at the rear of the tractor obviously might be separated entirely ahead of the tractor; but it will be noted from FIGS. 3, 4, 5, and 6 that the manifold suction hood 2 rests on a single framework 8, whose upper surface beneath the hood 2 normally is horizontal, and which is the front segment of a master rectangular framework, pivotally mounted on the rear axle housings of the tractor, that extends loosely around the tractor body and (with suitable trusses for reinforcement) supports the fan case 30 at the rear of the tractor, as well as the conduits 29 at the sides of the tractor body, in a more or less rigid framework arrangement that needs no flexible connections in the air conduits between the suction chambers beneath hood 2 and the fan case 30, on which the seed-cotton retaining basket 40 rests well above the cotton plants, which are not damaged by passage of the complete harvester supported by the tractor wheels (behind the suction chambers) that travel about midway between the several plant rows.

In FIG. 3 it can be seen that the suction chamber astride the plant row 1 having an inversely corresponding suction chamber on the left side of the tractor as indicated in FIGS. 1, 2, 4, and 5 has an air-tight ceiling formed by the bottom 28 of the manifold suction hood 2 and that normally horizontal members 8–1, 8–2, and 8–3, diagonally disposed at alternating angles across the plant row 1, support said ceiling, while only slightly obstructing the plant passage, as will be explained later in connection with FIG. 5. Likewise the side walls of the suction chamber parallel to the plant row 1 and to the longitudinal axis of the tractor are formed by the air-tight sidewalls (adjacent to the plant row) of the conduits 9 and 10, in which air under suction ascends to corresponding inlets in the floor 28 of the manifold suction hood 2 from long inlets 11 in the "middle" on each side of the plant row 1, that draw all the air from the suction chamber through said inlet areas that are contiguous to somewhat horizontal pans 12, below the conduits 9 and 10 and their walls adjacent the said plant rows that form the walls of the suction chambers. The conduits 9 and their connected underlying pans 12 extend the full length of the manifold hood 2 at the sides thereof (FIGS. 2, 5, and 9); and the conduit 10 with its underslung pan 12 extends even slightly forward of the manifold suction hood 2 (FIG. 2), although conduit 10 (shown in the drawings as sucking air from both suction chambers ahead of the tires 3 of the steering truck, even though the conduit 10 and the manifold suction hood 2 might be divided down the center), extending out in front of the tractor body, is wider and somewhat shorter than conduits 9 at the sides thereof. The pans 12, spaced slightly below the parallel walls of the suction chamber (which also are the walls of conduits 9 and 10 adjacent the row being harvested) and forming partial closures of the lower ends of ascending conduits 9 and 10, serve to collect and momentarily to retain seed-cotton drawn from the plants 1 in the suction chamber by the air suction originating at the fans in dual case 30 and drawn through the several substantially air-tight conduits, whose only inlets 11 are approximately on the same level and contiguous to the pans 12. Since the pans 12 extend completely across the spaces beneath the ascending conduits 9 and 10 (shown in FIG. 3 as having vertical and parallel walls, although it is not necessary that such walls be completely parallel or vertical), it might be considered that the suction chamber walls were the walls of the conduits 9 and 10 not adjacent to the straddled plant row 1. But this would ignore that the conduit 10 thus would have to be considered as occupying a part of the space of both suction chambers. The essential point, however, is that, whether the conduits 9 and 10 be outside the suction chamber (as shown in the drawings) or be made to extend down into a suction chamber astride the row of plants 1 without extending all the way from front to back of the suction chamber, all of the air is to be withdrawn from the suction chamber through inlets 11 that are contiguous to the pans 12, since provision of any other inlets to a common suction source above the inlets 11 contiguous to the pans 12 would mean that, even though a high pressure differential be provided between the fans and the interconnected air inlets, air would flow freely into the upper inlets, while the seed-cotton and more particularly heavier items of the air burden such as unopened bolls, sticks, etc. would tend to clog the lower inlets adjacent to the pans 12 almost immediately. The arrangement shown in the drawings, whereby all the air (insofar as it is possible to make the conduits air-tight) is removed from the suction chambers through inlets 11 contiguous to horizontal pans 12, is a means of utilizing gravity to aid air suction (having low pressure differential and corresponding large volume) in removing seed-cotton from the burrs of the plants, since the seed-cotton will tend to be drawn toward the inlets 11 at the bottom of the suction chamber by gravity as well as air suction, as indicated by the arrows 23. And thereafter the air burden of seed-cotton etc. will be drawn through the ascending air conduits 9 and 10 having slightly increased air speed as a result of minimum air restriction in the conduits due to features to be explained later.

While the pans 12 are very slightly tiltable longitudinally with the framework 8 in a manner to be explained later, they are shown in FIG. 1 as being horizontal laterally. However, FIG. 3 indicates that pans 12 optionally may tilt down laterally a little toward the "middles" between the rows of plants 1 to facilitate entrance of the seed-cotton into the inlets 11 of conduits 9 and 10. The edges of pans 12 adjacent to the plant rows 1 and about halfway between the "middles" and said plant rows 1 are supported by channel frames 13, which are suspended from framework 8 by rods 14 having top cross segments 15 that fit into the angle of the diagonally disposed horizontal frame members 8–1, 8–2, and 8–3 to keep the rods 14 from turning, when nuts are screwed onto the lower threaded ends of rods 14 below the holes in channel frames 13. The cross section through the center of rod 14 in FIG. 3 indicates that the rod 14 is enveloped by a tubular member 16, which is rotatable thereon, although means of lubrication therefor has not been shown. And the tubular member 16 in turn is enveloped by a tightly fitted tubular member 16' of a suitable material such as rubber or plastic, the intention being to make the tubular member 16' large enough that it will not tend to strip limbs of the cotton plants drawn toward the suction inlets 11, even though said members 16' are obstructions of the suction chamber passage above the pans 12 to some extent, while they support pans 12 and keep plant limbs from dragging seed-cotton off the said pans. Flat annnular members 17 in FIG. 3 indicate that suitable washers are to be provided around the rods 14 at the top and bottom of the tubular members 16 and 16' for different purposes such as retaining of lubricant, when the tubular members 16 are rotated around the rods 14. In some instances, however, such as in connection with FIGS. 13 and 14, it will be seen later that the members 16 can serve simply (without surrounding members 16') as spacing members above the pans 12 and need not rotate.

The transporting of seed-cotton from the conduit inlets 11 to the inlets of the fan case 30, however, is only a secondary function of the air suction by the fans at the rear of the tractor. The primary function of the air moving in the suction chambers beneath the manifold hood 2, before it gets into the ascending conduits 9 and 10, and when it is traveling at a somewhat lower rate of speed, is to pull the seed-cotton out of the burrs on the limbs in the stalk rows 1 with the aid of gravity, and with or without the assistance of chains and spring fingers (to be explained later), that tend to spread apart the plant limbs to permit air to come in contact with the lint from different angles, and that tend to tug slightly at the lint protruding from the burrs on the stalks to give the seed-cotton greater surface on which the moving air can pull inside the suction chambers astride the plant rows 1. Because of this primary function of the air in separating the seed-cotton from the burrs in plant rows 1 beneath the manifold suction hood 2, it is necessary, in order to increase air speed, to restrict the flow of air into the inverted U-shaped suction chambers by means other than the more or less rigid pans 12, which are about ten inches in width, and which normally have their edges adjacent to the plant rows 1 above longitudinal frames 13 almost a foot from the ground and thus offer no impediment to movement over terrain irregularities such as field terraces. As a partial means of providing such air restriction, as well as to keep trash and dirt from being drawn into the air conduits and to retain any seed-cotton that may tend to drop from the burrs in the plant rows 1 before reaching the pans 12, I provide long and narrow substantially air-tight but quite flexible curtains 18 (about ten inches wide and made of material such as very heavy canvas, which may be doubled conveniently to secure proper weight) that hinge from the sides of the pans 12 adjacent to the plant rows 1 being harvested. Under suction of the air beneath the manifold hood 2, the hinging flexible curtains 18 tend to be drawn up by the air pressure differential beneath the lower limbs of plant rows 1 into somewhat horizontal positions as indicated in FIGS. 1, 2, 3, 4, and 9, where it is indicated that the hinging curtains 18 become a sort of flexible but substantially air-tight extensions of pans 12 to the plant rows 1 with the exception of a narrow slot around the lower portions of the plan stalks. The flexibility of such a slot between the curtains 18 in the somewhat horizontal position is sufficient to allow for differences in width of rows and for failures of the steering wheels of the tractor to stay halfway between the plant rows 1. Such flexible hinging curtains 18 extend somewhat rearward of the manifold suction hood 2 (FIG. 2); and in this area (indicated by numeral 19) in which suction of the air is not quite as effective on the hinging curtains, they hang down somewhat vertically at their rear tips between the tires 4 (FIGS. 1, 3, and 4). The edges of the curtains 18, 19 adjacent the plant rows 1 are weighted by suitable weights 20 to keep them below the plant limbs as indicated in FIG. 3; and it is necessary at least to have weights on the front ends as indicated in FIG. 2, for the weights 20 at the front corners of the curtains 18 adjacent to the plant rows 1 make these curtains form a sort of flexible mouldboard to get beneath the plant limbs under suction at the front of the suction chambers beneath the manifold suction hood 2 and to keep the curtains from being drawn too far up into the suction chambers. Similar weights 20 at the rear tips of the pan extension curtains 19 are shown in FIGS. 9 and 10, but heavier weights are not so essential in that area. As will be explained in more detail later, the hinging curtains 19, which are almost vertical at their rear ends, and which merge into the almost (under suction) horizontal curtains 18 at the rear of the manifold suction hood 2, are the lower portions of inverted U-shaped flexible skirts 89 (FIG. 2) that form flexible rearward extensions of the suction chambers.

The inverted U-shaped flexible skirts 89 are attached to the rear portions of the manifold suction hood 2 above the suction chamber astride the plant rows 1 in an air-tight manner, such as fastening a two-inch forward extension of the skirt between the rear portion of the hood 2 and the lateral members (8–6, 8–7) of the horizontal frame 8 that are immediately back of the hood 2. And the front edges of the sides of the inverted U-shaped flexible skirts 89 are attached likewise in an air-tight manner to air restricting plates 21 and 22 (immediately ahead of tires 3 and 4), which are attached to the rear walls of conduits 9 and 10, to the pans 12, and to the manifold hood 2 above the pans 12, thus completing the rear wall closure of the suction chambers with the exception of the space between the somewhat horizontal hinging curtains 18 and the ceiling of the suction chambers. The foregoing explanation of the skirts 89 of course would imply that the two parallel sections of skirts 89 adjacent to the front tires 3 may be attached to the air restricting plate 22 at the rear of conduit 10 and ahead of tires 3 several feet ahead of the air restricting plates 21, that are attached to the rear of conduits 9 ahead of tires 4; and likewise the rear edges of those skirts 89 might be terminated somewhat diagonally across the plant rows 1. But, as will be seen later in connection with FIGS. 9 and 10, in order to show an air pressure system in connection with the suction chambers beneath the manifold suction hood 2, I have shown that a forward extension 018 of the skirt 89 (that basically is an upward extension of the flexible pan 18) beneath the hood 2 may be attached to horizontal frame member 3–5 rearward beneath the hood 2 to complete closure of the suction chamber in that respect. These forward extensions 018 of the inverted U-shaped skirts 89, which also are upward extensions of the flexible hinging pans 18 beneath the manifold hood 2 rearward of plate 22, have their forward edges attached to the parallel rearward extending segments of otherwise laterally disposed plate 22, that is attached to the rear wall of conduit 10, as will be explained later in connection with FIGS. 9 and 10.

Just as air restricting plates 21 and 22 are attached in an air-tight manner to the rear walls of conduits 9 and 10, to the rear edges of pans 12 and to the manifold suction hood 2 above them; so similar air restricting plates 86 (FIGS. 1 and 4), that further increase the speed of air entering the suction chambers, are attached to the front walls of conduits 9 and 10 (by means of rivets 25), to the front edges of pans 12, and to the manifold suction hood 2 above them in an air-tight manner. Likewise, vertical substantially air-tight flexible curtains 87 of material such as canvas are draped from a supporting strap 88, that conforms to the front portion of the horizontal framework 8, to which it is bolted, serve to restrict flow of air into the suction chambers even more at the front thereof. These curtains 87 are slotted directly over the plant rows 1; and grommets 87' are provided to draw the curtains together as desired for further air restriction, although the curtains 87 have been shown as rather short in FIG. 1 to reveal the chains 100' and the spring fingers 111 and 112 to be explained later. Note from FIG. 8 that the strap 88 supporting the curtains 87, which conforms to the front of the horizontal frame 8 and thereby to the front of the manifold suction hood 2 thereon, causes the curtains 87 to be diagonally disposed across the plant rows. And in this connection also it may be noted that, since the center conduit 10 extends further forward than the side conduits 9, the plants in rows 1 will tend to be drawn into the suction chambers first toward the conduit 10 and later toward the conduits 9, so that the air will have opportunity to play on the open seed-cotton from different angles as a result of the forward placement of the conduit 10 ahead of the conduits 9 on opposite sides of the plant rows 1. And these air suction currents from the diagonally disposed inlets of their respective conduits 9 and 10 play directly (without substantial air obstruction across the plant rows 1) with full strength from different angles in conjunction with the spring fingers that sway the plant stalks in a manner to be explained later.

Although it is contemplated that the air speed of the large volume of air passing (even with low pressure differential) through ascending conduits 9 and 10 (because large volume is necessary to draw the seed-cotton from the burrs on the stalks in the suction chambers, even though the entrances thereto be restricted at the ends as well as by the somewhat horizontal curtains 18 at the bottom thereof) will be sufficient to lift seed-cotton by suction the small height that is required, any heavier items in the air burden will not have to be so lifted vertically from the pans 12. In FIG. 2 the diagonally aligned rivets 24' in the walls of conduits 9 and 10 indicate that corresponding vanes 24 having right angle flanges for attachment inside these conduits (FIGS. 5, 9, and 10) are disposed somewhat rearward from bottom to top; and thus the air burden in these conduits 9 and 10 will tend to travel upward at a suitable angle from the vertical inside the conduits as indicated by the broken lines 23', just as the seed-cotton tends to fall and be drawn out of the cotton plants with the aid of gravity toward the inlets 11 in the suction chambers as indicated by the arrows 23. On reaching the inlets in the bottom 28 of the manifold suction hood 2, the air with its burden then moves somewhat horizontally as indicated by the curved arrows 23'' to merge at the arrows 5 (over the plant rows 1 in FIG. 3), which indicate in FIG. 2 the approximate path of the air stream rearward through the manifold hood 2 and the conduits 29 above the plant rows 1 toward the inlets of dual fan case 30, although the seed-cotton will tend to slide along the floors of these rearward conduits with a minimum of suction being required to tumble the seed-cotton and other air burden into the fan case 30 after the upward slope to the rear of the tractor from the suction chambers ahead of the tractor wheels.

While any number of vanes 24 may be installed in the conduits 9 and 10 to keep the walls thereof spaced apart under the air suction, which has to be only minimum because of the sloping conduit vanes 24 and sloping conduits 29, the absence of rivets 24' in connection with the broken line arrow 23' for air flow at the rear portion of conduit 9 indicates that no spacing vane 24 appears there. This indicates that, even though no vane 24 has been installed, the air-burden of seed cotton nevertheless will travel upward at an angle to the horizon as indicated by the arrow 23', because the rear portion of the conduit in time will fill up with immature and unopened bolls etc. to form a ramp up which the seed-cotton can travel with minimum suction, until the unopened bolls etc. are removed, after the operator may hear them traveling through the fans. But the conduit 9 will not clog with the heavier materials, because the inlets 11 are long and because the vertical lift distance is less than the distance forward to the vane 24 in the middle of the conduit 9, thus affording ample room in the conduit for a sloping ramp of heavy materials.

The vane 24 in the middle of conduit 9 extends down to the pan 12 (FIG. 2) only at its outside point (FIGS. 3 and 5); and thus there would be some tendency for unopened bolls to drift to the rear on the pans 12, even though the air with its burden of seed-cotton enters the conduit from the side ahead of that vane 24. But in FIG. 5 I have shown the other front vane 24 extending to the pan 12 all the way across the conduit 9 to indicate that all the unopened bolls might be rolled up such vanes 24, if it is desired to make them all that way and have three in each conduit 9. It is not necessary that the vanes 24 all extend down to the pans 12, however, although it is necessary that the inlets 11 be contiguous to such pans. In FIG. 10 it is indicated that the front vane 24 does not reach all the way to the pan 12, although this originally was shown simply because of the difficulty of representing the conduit 10 otherwise in a drawing. But failure to make the vane 24 reach the pan 12 simply would mean that very heavy materials such as unopened bolls would tend to collect in the middle of the pan 12 beneath the conduit 10, which would not clog, however, because of the length relative to the height of the inlet 11. And any such materials that might cone up in the middle of pan 12 and in conduit 10 would be protected from removal incident to dragging of plant limbs by the two rotating members 16' corresponding to the one shown in cross section in FIG. 3; but it has been indicated in FIG. 9 that these two members 16' (and their corresponding tubular members 16 and rods 14) may be omitted, when similar spacing members 16 are mounted on bolts 108 rearward of the air restricting plate 22 attached to the rear wall of conduit 10. The significant feature in both conduits 9 and 10, however, is that all the air is drawn from the inlets 11 contiguous to pans 12 shown in the drawings as extending completely beneath the conduits 9 and 10 that are outside of the primary suction chambers astride the plant rows with air-tight ceilings), so that there will be no clogging of the ascending conduits (other than the tendency to build up sloping ramps of materials having high specific gravity as described), whether the sloping surfaces up which the seed-cotton travels (from inlets 11 contiguous to long pans 12) with the air currents 23' be vanes 24 sloping upward inside conduits 9 and 10, whose upper ends are open completely to enter the manifold hood 2 as shown in the drawings, or whether the seed-cotton travel up from pans 12 on a ramp formed by heavier materials in the conduits, or whether a somewhat similar conduit having a sloping lower surface extending down to pans 12 might be made to pass through the rear or the inside walls of conduits 9 and 10 inside the suction chambers to enter the converging manifold suction hood 2 above. Having the sloping surfaces up vanes 24 as indicated by broken lines in FIG. 2 is simply a convenient means of construction for such sloping surfaces; and the same construction affords a convenient framework inside the manifold hood 2, to which the conduits are attached. Note in FIG. 3 that the reinforcing vanes 24 extend all the way up to the roof 28' of the manifold hood 2 and serve as spacers for its outer walls. Because of the air suction within the manifold hood 2, it is necessary to have further reinforcement of the roof 28'; and FIG. 3 indicates that such a framework 27 has been provided with its lateral arms reaching out almost to the side walls, which may be considered upward extensions of conduit 9 walls. The internal framework 27 also has forward extensions beneath the roof 28'; and it will be noted later in connection with FIG. 5 that some of these forward extensions are attached (through corresponding holes in bottom 28) to forward members of framework 8 as a means of attaching truss rods 76 thereto, in addition to attachment through holes 71 in framework 8.

The forward walls of conduits 9 and their attached air restricting plates 86, which obstruct pans 12 in front, are vertical but disposed at acute angles to the rows being harvested in order to deflect cotton plant limbs into the suction chambers. But the convex plates 86 ahead of the conduit 10 (and obstructed pan 12) between the harvested rows 1, which tend to come in contact with the plant limbs first at point 26 (at which it meets the pan 12 beneath it), is sloped rearward slightly toward the top in order to raise the plant limbs, even before they become subject appreciably to the air suction from above the hinging flexible air restricting curtains 18, whose forward tips are drawn down by weights 20 for the same purpose.

It of course would be possible to utilize my paired contra-rotating fans in dual case 30, at the rear of the tractor in connection with the conventional power-take-off shaft as shown in the drawings and as will be explained in more detail later, to suck air through large parallel longitudinal conduits 29 connecting directly over the plant rows 1 with orifices in the ceilings of bottom-slotted suction chambers astride the two rows being harvested, with the merging conduit feature of manifold hood 2 omitted altogether; but such an arrangement would mean that gravity would be a hindrance in getting the seed-cotton into the conduits 29 instead of being an auxiliary in drawing the seed-cotton from the plant burrs toward the inlets 11 of conduits 9 and 10 (beside the plant rows) contiguous to pans 12 below the suction chamber walls.

Before entering the conduits 29, however, the seed-cotton may, if desired, be subjected to a dehumidifying process that would facilitate operation of the machines during long hours and late at night, when the dew was just beginning to fall, and when incidentally hand harvesters could not operate on account of darkness. It of course is presumed that electric lights would be attached to the tractor for night operation. In FIGURES 1 and 2 are shown exhaust pipes 31 leading downward from the top of the engine exhaust muffler 32. Brackets 31' (FIGURE 1) serve as supports for the diagonally depending pipes 31. As indicated by the arrows 33, these exhaust pipes 31 discharge downward against the roof 28' of the manifold hood 2, which at these points slopes downward slightly toward the sides as well as toward the front of the harvester, thus assuring that the exhaust fumes will travel away from the engine and from the operator. Since inspection plates may be desirable for the hollow manifold "hood" 2, and since the heat from the internal combustion engine exhaust may tend to rust the light metal of the manifold hood, unless some protection be provided, somewhat rounded removable inspection plugs 34, to fit into corresponding holes in the manifold suction hood 2, have been indicated in the appropriate figures. The hot exhaust gases will give off enough heat by induction through the plugs 34 and the roof 28' of the manifold hood 2 to increase greatly the moisture carrying capacity of all the air that passes through the fans in the case 30.

If desired, use may be made also of heat from the tractor engine directly and its radiator 6 for the purpose of dehumidifying the air that enters the manifold hood 2. In FIGURE 2 a substantial closure is illustrated around the three open sides of the engine of the tractor, which has a conventional hood or upper portion 36, that may include a gasoline tank 37. But it is contemplated that such an air conduit closure 35 would leave the bottom thereof (around the engine, clutch, etc.) open to a considerable extent, so that air drawn in at the front through the grill 7 and the radiator 6 by the tractor radiator fan (not shown) would be forced downward as warm air toward the ground, and would be sucked up thereafter between the hinging flexible pans 18 and thence with the seed-cotton through the conduits 9 into the manifold hood 2 to pass rearward through the more or less horizontal (but slightly upward sloping) conduits 29 toward the fans in dual case 30. Thus use is made of most of the heat of combustion in the tractor engine which otherwise would be wasted.

Air from the two fans in dual case 30, along with the seed-cotton gathered (as the tractor moves down the rows) in a steady and continuous manner (so that the air under suction never is bothered with an overload of cotton), passes upward between the two fans at the rear, as indicated by the broken-line arrows 38 in FIGURES 2 and 7. The cotton may follow the route of the arrows 39 to be deposited in a basket 40, so placed relative to the rear wheels of the tractor that the seed-cotton load will not disturb appreciably the balance of the harvester on its pivotally mounted frame. The size of the "basket" or container 40 has been figured for harvesting a "round" of four rows one mile in length, and thus considerably more than fifteen hundred pounds of seed-cotton might be carried at times. All of the walls of the seed-cotton "basket" 40, whose frame may be of any suitable construction, may be of net construction; but at least the rear wall and roof of the "basket" should be of some material such as hardware cloth of about ¼ inch mesh, so that the air from the fans can pass through the mesh and carry away with it all the small particles of dried leaves and boll husks (not burrs) to make the grade of the ginned cotton even higher than it would be if "pulled" by hand.

A gate portion 41 of the rear wall of the "basket" 40 is made pivotal at both top and bottom by means of stud bolts 42 and 43, which of course might have tail tap heads. Such an arrangement makes it possible to unload the "basket" 40 easily by tilting it toward the rear on the four hinges 44 attached to the bottom frame of the "basket" 40 and to the supporting horizontal angle cross section frame members 45 carried on the tractor rear axle housing by a framework of the harvester proper to be described later. Note that the rear wall gate portion 41 also may be tilted inward alternatively into the "basket" 40 at the bottom on the upper pivot, as indicated by the dotted lines in FIG. 2. (Prior to such tilting inward of the rear wall section 41, air from the fans will have carried the seed-cotton forward and will have left the rear portion of the "basket" 40 unfilled until the last.) The basket 40 may be tilted on the hinges 44 by hydraulic means such as the cylinder 46, whose piston is actuated by the tractor hydraulic pump with proper control valves in a conventional manner, and which is pivotally mounted between a cross member 48 in the floor frame of the "basket" 40 and the rear portion of the tractor body just back of the operator's seat 106 (FIGS. 5 and 6) behind the steering wheel 47 (FIG. 2).

Immediately forward of each of the fans in dual case 30 is a conduit 49 leading down from the upper level of frames 45 immediately below the "basket" 40 to one of the rather horizontal conduits 29, which have holes in their upper walls for this accommodation. The bottom of the "basket" 40, having holes therein to conform to the inlets of conduits 49, has been provided with accommodating slidable closures 99, whose sides rest on the frames 45, as will be explained later. If the rear section 41 of the "basket" 40 be fastened in the position shown by the broken lines in FIG. 2, the slidable closures 99 may be moved longitudinally of the tractor to permit seed-cotton to be sucked into the fans through the conduits 49 and 29 for expulsion rearward as indicated by the arrow 51. Of course the "basket" 40 might have been made tiltable to the side by means of the hydraulic mechanism just as readily, but the present arrangement makes a convenient one for a "reairing" of the cotton in unloading from the "basket" in the manner indicates. In this case a gradual tilting rearward of the "basket" 40 will cause the cotton to fall gradually into the conduits 49 for feeding into the fans in dual case 30, and the position of the conduits 49 adjacent to the operator's seat 106 will enable him to loosen the cotton in the holes in the bottom of the "basket" 40 by hand, if necessary. The hailscreen or hardware cloth mesh of the rear section 41 will permit any remaining small trash in the seed-cotton to pass through it, upward, and away, as the seed-cotton is diverted rearward in the direction indicated by the arrow 51.

Feeding of the seed-cotton into the conduits 49 is facilitated by the form of the bottom of the "basket" 40. In FIG. 2 the dotted line 52 indicates the crest of a gable in the bottom of the "basket" 40, which may be seen in transverse section in FIG. 1. The inverted V shape of the gable 52 serves multiple purposes: (1) of diverting the cotton to the sides, so that it will fall into the conduits 49, (2) of reinforcing the bottom of the "basket" 40, and (3) of making head room for the operator sitting on the seat 106 of the conventional "three-wheeled" tractor. Of course, if the operator is a very large man and not active, he may want to use the hydraulic mechanism 46 to tilt the "basket" rearward before assuming his seat on the tractor. Suitable steps for the operator's mounting of the tractor may be provided immediately in front of the rear wheel tires 4, but their attachment to the framework 8 at such points is not a part of the present specification.

Without defoliation of the cotton plants, if the volume of air together with pressure differential and speed of air flow in the present mechanism be increased sufficiently, the suction will remove some green leaves from the cotton plants along with the seed-cotton, even though the machine is designed to minimize that effect. It therefore is desirable to keep the suction to the minimum required for handling the seed-cotton. In this connection it should be emphasized that in the present mechanism suction is required for handling the seed-cotton only, and that the burrs are left in the field without the necessity of hauling their added weight to and from the gin for maintaining the fertility of the soil. Neither is it necessary to provide air suction speeds sufficient to handle the weight of the cotton plant limbs left standing in the field. But, if some of the green leaves are pulled into the "basket" 40 by suction of the air, it may be desirable to "cure" the seed-cotton containing such green leaf particles for several days in a loft or on a roof, until the leaf particles are dry enough to crumble. To facilitate such "curing," the cotton can be directed by the fans as indicated by the arrow 51. To protect against dew and rain, it is suggested that a canvas tarpaulin be provided for covering the top and rear of the "basket" 40 at night, if cotton is to be left in it; and this same tarpaulin may be utilized to form a sort of conduit for guiding the cotton at 51 into the loft or onto a roof for drying. After the "curing" interval, the seed-cotton may be reloaded from the loft or roof into the "basket" 40 with hand forks; and in this connection it will be noted that, as indicated by the stud bolt heads 53, the top of the basket is made in two sections 54 pivotally mounted at the lower corners, so that they may be folded back (see FIG. 7) to provide a sort of chute for such loading from a higher level. The "cured" cotton then can be transferred through the fans as previously explained to load into trucks or trailers for hauling to the gin, if no curing bins be provided at the gin; and in the process of transfer from the "basket" 40 to the truck or trailer the fans will remove the dried leaf particles from the seed-cotton by expulsion of such trash through the net or mesh member 41. Obviously a small tarpaulin might be placed over the seed-cotton in the "basket" 40 to prevent trash particles that pass through the deflecting net of the "basket" member 41 from settling on the seed-cotton therein again.

Since my mechanism does not do appreciable damage to cotton plants in the field, it is possible to harvest the open portion of the seed-cotton in a field without waiting for all the cotton to mature, subject to weather damage, since unmatured bolls are not damaged by the air. And likewise at the close of the season after frost in some areas, the flowing air will be selective and will not harvest immature and discolored cotton of partially opened bolls that would lower the grade and fiber quality of the cotton sample for sale purposes. The present mechanism has been designed first of all for use in the areas of short growing seasons for cotton, in which only the "knotty" and premature bolls may open before light frosts cause the leaves to drop from the cotton plants. In most instances in such areas after frost it may be found most convenient to dump the basket by means of the hydraulic mechanism 46 into trailers for hauling directly to the gin. Such dumping is convenient with trailers having low sideboards, since the bottom of the basket is about six feet from the ground, although the overall height is not excessive in comparison with the widely spaced rear wheels of the tractor that straddles two rows.

A truck or trailer may be driven past the rear of the harvester for hydraulic tilt dumping of the basket; but, if it is necessary to back up to a barn for unloading, use may be made of a guard frame extension 55 at the rear of the fan case 30 in order to protect the fan V-belt sprockets 56 and 57, which of course alternatively might be suitable sprockets for carrying drive chains of suitable nature. For such reasons, it also is useful to provide a transparent rear closure 58 for the gable 52 in the bottom of the "basket" 40; and this closure or "window" 58 also will reveal to the operator how clean he is harvesting the cottonrows, although the harvester operates automatically for all practical purposes.

Depending on the design of the tractor to which the harvester is attached, some variation may be made in the generally rectangular framework, shown pivotally mounted on horizontal lateral axis over the rear axle housings of the tractor and loosely enclosing the long slender tractor body to permit longitudinal tilting on the lateral axis, that supports the manifold suction hood 2 and suction chambers at the front, the fan cases 30 and fans at the rear, and the seed-cotton retaining basket 40 somewhat over the central section of the rectangular framework. A unique feature of this generally rectangular framework shown in the drawings is that its parallel, spliced, and interlocking central members 59, 60 mounted over the rear axle housings about midway between the tractor body B and its widely spaced rear tires 4 makes it possible to utilize nearly all of the space between the rear wheels and body of the tractor (on which the operator sits) for containing at very low level a pair of very large cross section conduits 29, upward sloping toward the rear, communicating directly and without any bends between the manifold suction hood 2 (and its depending suction chambers) and the inlets of the dual fan case 30, whose fans inside thereof are rotated by V-belt drives from a flexible rearward extension of the power-take-off of the conventional farm tractor in the center of the tractor body at its rear. No belts have been shown on the belt sprockets 57 (driven from the tractor power-take-off shaft through the universal joint 91, which has an expansible shaft (not shown) between it and a similar universal joint mounted on the power-take-off shaft in a conventional manner) that drive the fan sprockets 56 (only one of which can be seen in FIG. 2) at the rear of the dual fan case 30. Since the conduits 29 between the rear wheels and body of the tractor are mounted directly on top of the parallel longitudinal upward sloping central frame members 59, 60, the air inlets of the dual fan case 30 have their lower edges only slightly above the rear wheel housings of the tractor, thus minimizing the height to which it is necessary to suck the seed-cotton, which travels rearward on upward sloping surfaces both before and after its journey through the manifold suction hood 2, having a normally horizontal floor 28. And yet, since the fans are spaced apart with their axes substantially over the cotton rows and parallel to the longitudinal axis of the tractor in the approximate centers of the air inlets to dual case 30 from the rear ends of the large conduits 29, the lower central portion of the dual fan case 30 is sufficiently high to permit the flexible rearward extension of the tractor power-take-off shaft to pass below the dual fan case 30 to turn sprockets at the rear thereof, so that both driving and driven sprockets (whether for belts or chains) are entirely removed from any conflict with most suitable paths for the air and seed-cotton, after it has reached the fan case 30, in which the seed-cotton is tossed upward into the basket 40 above by the blades 93 without any need for an air pressure differential to "blow" the seed cotton anywhere, since the seed-cotton comes to rest immediately in the basket, when the large volume of air loses its speed in passing through the top and rear wall having a mesh just fine enough to retain the seed-cotton.

Another unique feature in the present instance is that the central portion of the main longitudinal framework is divisible over the rear axle to facilitate easy dismantling from an ordinary "three-wheel" tractor, permitting use of the tractor without modification for other purposes, when not in use for harvesting, although value in connection with the harvester may dictate use on a custom basis over wide areas and over a considerable time by each machine. In FIGS. 1, 2, 3, and 4 it can be seen that the horizontal framework 8 underlies the manifold suction hood 2 between the air conduits 9. As will be explained more fully later, the framework 8 has two parallel rearward extensions 59 (FIGS. 2, 5, and 7), which are angular in cross section with the angle turned downward, and which are spaced apart so that each is about midway between the tractor body and one of the rear tires 4. At points forward of the rear tires 4 these rearward extensions 59 of the frame 8 are "bent up" or attached at a suitable slight angle to the horizontal frame 8; and the angular frame members 59 extend rearward to overlap into larger angular frame members 60, which rest on the rear axle housings 90 of the tractor in suitably attached brackets 61 permitting slight pivotal oscillation above the axle housing, to which the brackets 61 are held loosely by U-bolts 63 in the present embodiment. The fact that the angle frames 59 and 60 are at a slight angle to the horizon will permit easy alignment of the "hood" 2 frame extensions 59 in the main frames 60 (after the rear portion of the harvester attached to these latter frames has been mounted on the tractor) by driving the tractor into the central recess of the manifold suction "hood" 2, whose underlying frame 8 may have been stored on two small "A" frames of suitable height spaced on the ground to correspond with ordinary cotton rows. A plan view of such a double interlacing spliced framework above the rear axle housing 90 of the tractor has been shown in FIGS. 5 and 6. Bolts at 64 have been indicated for the purpose of holding angle frame members 59 in the larger angle frame members 60. The two rearward air conduits 29 may rest on suitable cushioning material directly over these interlocking spliced angle cross section frame members 59 and 60.

And in FIG. 6 also the angle frame member 65 ties the two frame members 60 together in a rear segment framework which supports vertical angle frames 66 and 74 (shown in cross section by hatching) supporting the dual fan case 30 and the basket 40. In FIG. 7 may be seen a vertical lateral cross section of the angle frames 60 at the axis of the rear wheel axle housing with a vertical elevation of the framework of the harvester rearward of the tractor tires 4 observable by virtue of omission of conduits 29 and 49. Lateral frame member 65 supports four vertical frame members 66, which in turn are attached in pairs to lateral frame members 67, beneath which are bolted suitable bearings at 68 to carry fans (with suitable dust protectors 69 at the ends of the fan shafts) whose spokes are designated 70. Other angle cross section frame members 71 complete the rectangular frames in which are inserted the ends of the air conduits 29, that have been omitted from this figure to give a clearer view of the spokes 70 of the fans, portions of which inside the dual fan case 30 (rearward of the conduit openings that reveal the central portions of the fans) have been indicated by broken lines. To the cross frame member 65 also are welded longitudinal horizontal angle cross section frame members 72, which support the housings 30 of the fans. In FIG. 6 small holes have been shown in the angle frame members 72 for accommodation of bolts with which to hold suitable cushioning material between the fan case 30 and the angle frame members 72. After placing the fan housings 30 in position on the frame members 72, another lateral frame member 73 has been bolted to the ends of frame members 72; and this lateral frame member 73 has attached to it vertical frame members 74, which are bolted to the upper horizontal frame members 45, one of which is shown in FIG. 2 beneath the basket 40. The vertical members 74 have suitable horizontal frames for supporting rear fan bearings corresponding exactly to the way in which the lateral frames 67 support the fan bearings at 68 in front of the fans.

Suitable diagonal frame braces 75 are to be provided for giving rigidity to the whole framework, but it is necessary to have long detachable truss rods 76 to counterbalance the frames 8 and 27 supporting the manifold suction "hood" 2 against the weight of the fan cases, fans, etc. at the rear of the tractor over the rear axle housing. The truss rods 76 also brace the forward portion of the frame members 45 beneath the "basket" 40 against side movement, since they are attached, through suitable openings in the manifold suction "hood" 2, to its roof-supporting internal framework 27 and its attached lower horizontal framework 8 (only one member of which can be seen in FIG. 2) about two feet apart (FIG. 1) by bolts and nuts 77' that are attached to framework 8 through holes 77, one of which may be seen in FIG. 5, in which it is to be understood that the half of internal framework 27 cut away to show the hole 77 in framework 8 is a corresponding left-side duplication of the half of framework 7 shown on the right. Note in FIG. 5 that the framework 27 inside the hood 2 (and therefore the truss rods 76 on the outside thereof) are attached to the framework 8 below it (as through corresponding holes in the hood 2) not only at two holes 77 directly below the nuts 77' but also at forward points as indicated by one of two bolts 27'. It has been found desirable to make the manifold suction "hood" 2 in sections convenient for assembly on the horizontal frame 8; but these details of construction, when completed in a most desirable design, will be made the subject of another application rather than a part of the present specification. The truss rods 76 are made in sections provided with threads for adjusting turnbuckles 78. Each rod 76 also has a loop 79 by means of which the forward portion may be attached with a bolt directly to the tractor at the threaded hole 80 for the purpose of counterbalancing the horizontal framework members 45 (beneath the basket 40) that are rigidly attached to the rear framework supporting the dual fan case 30, fans, etc. in the interval during which the tractor is being driven into the recess of the manifold "hood" 2 for the permanent attachment of the bolts and nuts 77′ as shown in FIGS. 1 and 2, where it can be seen that the detachable rods 76 in conjunction with the framework beneath the "basket" 40 serve as trusses to support the forward portion of the manifold suction "hood" frame 8 almost in balance with those portions of the harvester that are rearward of the rear axle housing shown in broken lines at the center of the rear wheel tire 4.

The vertical angle-frame member 81 shown in FIG. 2 supporting the front of basket 40 is bolted to one of two coordinate vertical strap frame members 81′, whose cross sections can be seen hatched in FIG. 5 as well as in FIGS. 1, 3, and 4. The purpose is to give increased strength and stability to the frame beneath the "basket" 40 for carrying the seed-cotton load, after the rear portion of the harvester is mounted on the tractor; and it is mentioned here to emphasize the way in which I have utilized all the space between the tractor "body" and the rear tires 4 (immediately above the parallel upward sloping central frame members 59, 60 directly over the cotton rows being harvested) for the air conduits 29, which must be very large in cross section to accommodate without excessive friction the large volume of air necessary (with low pressure differential) for the operation of such a harvester to strip the seed-cotton from the plants in the partly restricted suction chambers between air-ascending conduits 9 and 10, even though the load of cotton in the said air be not large at any time. Both vertical central frame members 81 and 81′ may rest on the lateral central frame members 103 (preferably "I" cross section beams, to which the strap frames 81′ are welded) welded to main parallel longitudinal frame members 60.

Similar vertical frames 82 are attached to lateral extensions 8–7 from the forward portions of parallel longitudinal frame members 59 at the rear ends of the manifold suction hood 2 adjacent the conduits 29, where the lateral extensions 8–6 and 8–7 from frame members 59 are considered parts of horizontal framework 8, even though shown in the drawings as not extending entirely under manifold suction hood 2. And in FIGURES 1, 3, and 4 can be seen two spacing tubes 83, through which a long horizontal lateral rod 84 having threaded ends is inserted to tie the two rearward extending sections of the manifold suction hood 2 together above the tractor body with some clearance. For clarity of exposition a similar spacing tube over the tractor has been left off the rod 84 in these figures in order to reveal this rod 84, whose threaded nuts at the end thereof permit drawing tight on the three spacing tubes without crushing the air conduits 29.

The rod 84 carrying the spacers 83 (including the third spacing tube not shown) has been located in an open space above the tractor near the shaft of the steering wheel 47; and this position makes it possible for the entire harvesting machine to be tilted pivotally on the central framework members 59, 60 over the rear axle housing of the tractor as a horizontal lateral axis, in order to raise and lower the front end of the manifold suction hood 2 to adapt the harvester to tall and short cotton stalks without in any way altering the position of the hood 2 relative to the dual fan case 30 and the basket 40, thus removing necessity for flexibility in this connecting air conduits between the suction chambers at the front beneath said hood 2 and the inlets of dual fan case 30, as well as the basket 40. Control of the height of the front of the manifold suction hood 2 and its depending conduits etc. is accomplished (FIGS. 1, 2, 5, 9, and 10) by linkage of the regular hydraulic mechanism 85L of the tractor (ordinarily used for adjusting depth of tillage implements) to vertical members 85 attached at the sides of the tractor body to segments 8–5 of the manifold suction hood frame 8.

Just as the light metal plates 21 and 22 restrict the flow of air around the cototn plants beneath the manifold hood 2 at the rear thereof (FIGS. 2 and 3) by substantially air-tight attachment of said plates to the pans 12, to the conduits 9 and 10, and to the bottom 28 of the hood 2, FIGURES 1, 2, 4, 9, and 10 show similar light plates 86 attached (by rivets 25) to the forward walls of the ascending air conduits 9 and 10 between the cotton rows as well as to the manifold suction hood 2 and to the pans 12 and extending toward the cotton rows, ahead of the tubular spacing members or rollers 16 that envelop rods 14 supporting the inner edges of pans 12, to restrict the area within which air under suction may enter the suction chambers under the manifold hood 2, thus increasing the speed of the air to strip cotton from the burrs of the cotton bolls, as the plants are passed over by the manifold suction hood 2.

If the cotton stalks be short, and if there be no leaves remaining on the stalks as a result of chemical defoliation or frost, it may be desirable to restrict the front air entrances beneath the hood 2 even more by inserting canvas or other flexible curtains, as indicated by slit curtains 87 in FIG. 1. FIG. 8 shows by plan view from above the shape of a metal strap 88 which may be used to support such curtains 87 with stud bolts inserted in the holes in the angle frame members of horizontal frame 8 in FIG. 4. Note in FIG. 8 that the curtain strap 88 attached to framework 8 will make curtains 87 be disposed diagonally rather than perpendicularly to the line of movement of the tractor along the rows of plants, which first will be drawn toward suction conduit 10 between the diagonally disposed curtains 87. In FIG. 1 may be seen grommets 87′ in such curtains 87 by means of which the curtain members may be laced together in part to restrict the flow of air even more; but under any circumstances the lower parts of the flexible curtains 87 will conform somewhat to the size of the cotton stalks, even though the lower portions of the curtains be not weighted, as they obviously might be.

Somewhat similar flexible curtains are used to restrict the flow of air under the manifold "hood" 2 along the cotton rows 1 at the rear of the manifold "hood" 2, behind which the curtains, forming a horizontal tube slotted at the bottom longitudinally of the tractor, might be spoken of as constituting a "skirt" 89 in the form of an inverted U. In FIG. 4 it has been presumed that a "skirt" 89 constituting such an inverted U (with partial closure by segments 19 at the bottom) conforms closely to the rollers 16′ that precede it and the upper or horizontal section of the "skirt" 89 does not extend back to the housing 90 of the rear axle, which can be seen here together with the lower portion of the U-bolts 63 that hold the harvester on the tractor. It is not contemplated, however, that the "skirt" 89 would be held in any such rigid position as is indicated in FIG. 4. A better idea of the "skirt" 89 may be obtained from FIGS. 2, 3, and 10.

Because of the nature of the air suction conduits leading from both sides of the suction chambers beneath the manifold hood 2 (short ascending conduits 9 and 10 having horizontal cross sections that are narrow but long in their dimensions parallel to the cotton rows, and merging by way of the manifold hood 2 into approximately double size conduits 29 that project rearward at a very slight incline upward directly above the cotton rows being harvested to the corresponding inlets in the dual fan case 30) and their situation relative to the axes of specially designed fans, whose axes are approximately over and parallel to the cotton rows, and whose air inlets into the dual fan case 30 require no bends in the suction conduits 29, a great volume of air will pass under the manifold suction hood 2 at high speeds. At 91 in FIG. 2 is indicated diagrammatically a universal joint, which is one of two such universal joints with a linear expansion joint in the shaft between them, that transmits power from the power-take-off shaft at the rear center of the tractor body. The rear universal joint 91 is attached to one of multiple shafts in a gear box 92, whose intermeshing gears cause the shafts on which V-belt sprockets 57 are mounted to rotate in opposite directions for rotating the fans in such directions that the air and seed-cotton sucked into the fans will be discharged into converging currents between the fans as indicated by the broken-line arrows 38 in FIG. 7. When cotton-carrying air is passed at high speed through a single squirrel-cage fan, it has a tendency to roll the cotton on the curved entrance of the ordinary discharge pipe; and there is a tendency, if the cotton be at all moist, for the cotton to roll into balls that are difficult to gin without injury to the fiber. But the double fans as shown in FIG. 7 receive the cotton through straight conduits 29 and then toss it sideways from the fan blades into the converging air currents 38, which fluff it thoroughly in tossing it upward into the "basket" 40. It will be noted that the force of gravity acting on the seed-cotton, as it enters the fans under these circumstances, permits alignment of the blades 93 at the ends of the spokes 70 at a considerable angle to the fan spokes, which also are slightly tangential to the fan hubs in which the fan shafts are mounted. This angle of the blades 93 might tend to roll seed-cotton in a single fan; but it can be seen, from the housing between the fans indicated by the dotted lines 94, that the converging currents of air will leave this housing 94 quickly without rolling the cotton in any manner and will fluff the seed-cotton upward in the drying air. FIGURE 7 also shows the way in which the cotton-bearing air will discharge diagonally against the hailscreen grill gate 41 at the rear of the basket 40 as well as against the screened top of the "basket," which has been described in connection with FIG. 2. And note again from FIG. 7 in this connection that the top of the basket 40 is made in two sections mounted on pivots at 53 for reloading any previously wet or damp seed-cotton into the basket 40 for further airing by passing it through the fans.

While the large fans here illustrated (with wide blades conforming loosely with the dual fan case 30) are capable of carrying very large quantities of air (particularly with low pressure differential made possible by low suction lift and sloping vanes 24 and conduits 29) that make the steady stream of seed-cotton comprise very little burden thereto, it will be appreciated that it is not necessary to rotate such fans as speeds comparable to those of fans that suck large quantities of packed and cohesive seed-cotton (plus burrs and some stalks of much greater specific gravity at times) quickly from wagons or trucks at cotton gins. Accordingly the V-belts 92' in FIG. 7 are shown as leading from drive belt sprockets 57 that are only slightly larger than the driven sprockets 56 of the fans, although the size of the sprockets might be varied to increase the speed of the fans, particularly if the horsepower of the tractor be large enough to permit design of a manifold suction hood broad enough for harvesting four rows instead of two. Proper tension of the V-belts may be maintained by virtue of the fact that the gear box 92 is hung from vertically slidable brackets 95 mounted on bolts 96 in the lateral frame members 65 and 73. Of course, if desired, chain belts might be substituted for the V-belts, or crossed V-belts might be used in lieu of the gears in box 92 to make the fans contrarotating.

FIG. 5 shows the various members of normally horizontal framework 8 extending across the cotton rows beneath the manifold hood 2 (and supporting the vertical depending conduits 9 and 10 in the "middles") placed at suitable alternately opposing angles to the line of travel of the tractor to cause any cotton stalks that touch them in the suction chambers to be waved gently from side to side to give the air under suction the best chance to play through the limbs and foliage of the plants from different angles, in order to aid in the process by which any dry loose seed-cotton will be extracted from the burrs and carried to the air ducts leading to the fans. No green leaves will be caught and pulled from the cotton plants by the diagonally disposed frame members 8–1, 8–2, and 8–3 across the plant rows beneath the manifold suction hood 2, because the "angle" of these members of the substantially horizontal framework 8 is turned downward.

Suitable variations of structure of course may be made in constructing the harvester. For instance, rubber cushions 97 may be placed beneath the bottom frame members of the basket 40 to support the basket on the horizontal frame members 45 in FIG. 2. By numeral 98 in FIG. 7 I have indicated a slidable (horizontally and longitudinally of the tractor) closure of the opening in the rear center of the floor of the basket 40, through which cotton-bearing air enters the basket from beneath at arrows 38. And 99 indicates the two somewhat similar slidable closures of the upper ends of the conduits 49 (not shown in FIG. 7) through which cotton may be sucked into the fans from the bottom of the basket 40 under circumstances described previously. Closures 99 rest on the horizontal frame members 45, while the larger central closure 98 is a part of the bottom of the basket 40, as shown in the drawings.

To insure that heavy foliage on the stalks of cotton in some instances might be agitated to permit separation of the seed-cotton therefrom, I have shown (FIG. 5) multiple threaded nuts 100 over corresponding holes in horizontal angularly disposed angle frame members 8–1 and 8–2 for bolting thereto of short chains that hang downward to obstruct the passages through the suction chambers and separate the foliage gently on dragging through the tops of the cotton plants; and two such chains, that need not have as large or as heavy links as shown, are indicated by the numerals 100' in FIG. 1. FIG. 12 is a larger scale fragmentary vertical detail of such an agitating chain viewed from the cross sectional line C12—C12' of FIG. 5.

The design of the "pans" 12 (in the "middles" between the cotton rows), into which the seed-cotton settles before being sucked upward and rearward in the air conduits 9 and 10, may be varied somewhat. In FIG. 5 I have shown the pan frames 13 as angular in cross section, whereas they were specified as inverted channel frames in connection with FIG. 3; and it would seem obvious that such an angle-frame might be made a part of the pans 12, as I have illustrated in FIGS. 1 and 2. But in FIG. 5 I have shown the angle cross section frames 13' as separate from the pans 12 in order to indicate easily how such frames 13' may be extended to the rear between the tires 4 by welding on straps 101, which optionally may (when inserted in suitable horizontal hems sewn onto trailing slotted tubular skirts 89 at levels corresponding to pan frames 13') serve in part to support the flexible curtain-pans 19 depending therefrom between the tractor wheel tires 4. In that area rearward of "hood" 2, as may be seen in FIG. 2, the hinging flexible "pans" 18 otherwise designated as curtains (in absence of suction) merge gradually into partially vertical curtains 19 (under suction), which in turn merge into the vertical segments of trailing skirts 89 above (FIGS. 1, 3, and 4). In FIG. 5 are shown rearward horizontal longitudinal extensions 102 of frame members 8–5 (between the tractor tires 4) to which the upper portions of the inverted U "skirt" 89 may be tied just as the lower part of skirt 89 may be tied to straps 101 in lieu of providing hems. But, if the extensions 101 and 102 be shortened or omitted entirely, the inverted U skirt 89 will tend to fall down just like a curtain. The essential point is that the inverted U skirt 89, having some appreciable horizontal length, has to be supported near its rear end by attachment to rearward frame extensions such as 102 and optionally to extensions 101, although a weighted cord over the rear axle housing 90 of the tractor will perform the same function to keep the flexible horizontal extensions of the suction chamber from getting under the tractor tires in reversing.

The holes in the lateral extensions 103 (from parallel longitudinal central frames 60, FIG. 5) indicate that the longitudinal frame extensions 102 beneath them (from framework 8) may be bolted to them, after central framework members 59 and 60 are brought into proper positions. Likewise inward lateral frame extensions 104 from the main central framework members 60 may be bolted to the inner frame extensions 102 (from the horizontal framework 8) to give rigidity to the whole frame structure as well as to support the conduits 29.

FIGS 5 and 7 show spacing members 105, which hold the main counterbalancing framework brackets 61 (FIG. 2) in proper position laterally relative to the tractor body. The spacers 105 are bolted to the gear housing which constitutes the tractor "body" B in that area, above which the operator's seat 106 is shown centrally located between the longitudinal frames 60.

It previously has been indicated that air from the radiator fan of the tractor may be directed downward by a partial closure 35 to dehydrate the air entering the manifold suction hood 2 from beneath the slit between the hinging flexible pans 18; and it would be possible to direct this warm air from a completed conduit closure 35 into the cotton plants at some points above the hinging flexible pans 18. But, since the radiator fan would have little volume or pressure for use as a means of directing an air blast into the cotton plants, it would appear more advantageous for the purpose of directing air into the cotton plants under pressure to design such an elective arrangement to use air under pressure from another source, such as the exterior of cases 30 of the large fans at the rear of the tractor. Such a elective conduit closure arrangement has been indicated in FIGS. 9, 10, and 11 in the space beneath the ordinary tractor rearward of the engine and clutch thereof; and it is presumed that air expelled under pressure from the fans in the dual case 30 through suitably flanged orifices 107' will enter the closure 35A (constituting a hobble between the two suction chambers as shown in the drawings) through conduits 107, which may be flexible and pass over the spacing members 105, under the conduits 29, and along the lower sides of the tractor body to reach said conduit closure 35A. A vertical lateral cross section of the air pressure conduit arrangement indicated in FIG. 10 (line 11C—11C') as being beneath the tractor body is shown in FIG. 11, in which the paths of the air are indicated by the arrows showing that air coming from dual conduits 107 coming from the dual fan case 30 is directed into horizontal slots connecting with the suction chambers astride the cotton plants. Angle frames 110 at the bottom of the conduit closure 35A serve to direct the air somewhat upward under pressure. Of course the apertures in closure 35A through which air is forced under pressure might have been vertical slots just as well as horizontal. Note that angle frames 110 do not project out beyond curtains 018 into the suction chambers.

A view of the flexible curtains 018 indicated in FIGURE 11 as forming segments of the suction chamber walls is shown in FIG. 10, which is a fragmentary vertical cross section in part looking outward from beneath the tractor "body" along its longitudinal axis, and in which the adjacent merging edge of the hinging flexible "pan" 18 (under suction) extends upward as a flexible curtain 018 adjacent the tires 3 of the steering truck. FIG. 10 should be viewed in connection with FIG. 9, in which the corresponding frame structures may be seen immediately above FIG. 10. It will be borne in mind, however, that use of air under pressure as illustrated by the conduit closure 35A is only optional. Simplicity of construction would seem to dictate use of suction only, since any air that is forced under the manifold suction hood 2 under pressure will detract from the tendency of air to suck cotton toward the conduits 9 and 10 as the cotton plants "pass" through the front curtains 87 and the bottom-slotted flexible tubes 89 at the rear of the suction chambers beneath the manifold suction hood 2.

It will be found desirable under some circumstances to have air suction, that is less intense, acting in conjunction with mechanical means of assisting the air flow to snatch the seed-cotton loose from the burrs on the cotton plants in the same operation. (This is not to be confused with present means of picking the cotton from the burrs by mechanical means such as power actuated spindles and then transporting the cotton, that has been picked mechanically and doffed mechanically into a doffing chamber, by air conduits having small volume but high speed to a suitable basket or retainer.) One such means is illustrated in FIG. 14, which is a fragmentary detail of about one-half actual size of spring "finger" arrangements designated 111 in other FIGURES 1 and 9. In these figures it can be seen that such spring fingers 111 (here shown as having small ball tips on the ends projecting into the cotton plants) will tend to drag through the branches or limbs of the cotton plants and in so obstructing the suction chambers will snatch the seed-cotton, projecting from the burrs, out to be carried to the air conduits and thence to the fans by the air under suction, since the lint of one seed tends to be meshed with that of the one adjoining in the burr at which the spring finger 111 tugs. Although only the lowest fingers 111 are shown in FIG. 9, which is a horizontal cross section at the level of line 9C—9C' in FIG. 1, it will be appreciated that the multiple spring fingers 111, while acting independently to conform to the branches of the cotton plants that may be tilted forward in the process, form phalanges that will tend to press the cotton plants first toward the suction of air conduit 10, behind the flexible curtains 87 and air restricting plates 86 diagonally disposed relative to the cotton rows, and shortly thereafter toward the conduits 9, as the tractor moves along the rows. The fingers 111 shown here act on the cotton plants and their cotton-yielding burrs in the suction chambers beneath the manifold hood 2 at different alternating times, during all of which times the seed-cotton is being drawn from the burrs on the plants in the suction chambers astride the rows by the air suction also in varying degree of intensity. Any flexible spring arrangement may be used, but in FIG. 14 I have shown a convenient means of mounting spring fingers 111 having coils therein (to give increased flexibility) mounted around spacing tubes 16 surrounding the rods 14 by means of which the angular sections 13" of the pans 12 are supported. Such spacing tubes 16 may be rotatable around the rods 14, as explained in connection with FIG. 3; but rotation is not necessary for mounting of the springs 111 thereon. FIG. 14 is a detail cross section through one of multiple horizontal slots (for slidably accommodating a spring finger 111) in a narrow rearward extending projection of a frontal plate 86 at its side adjacent the cotton row beneath the manifold hood 2; and this figure also shows a cross section of a vertical angular member 113 to which one end of all the coil springs mounted on the tube 16 enclosing the bolt 14 may be attached suitably. Note that the short mounting tips of the coiled springs 111 are clamped between the narrow longitudinal segments of frontal plates 86 and the vertical framing member 113 of angular cross section by means of small bolts. One of multiple small bolts also is shown as a means of attaching a metal strap 13A' for holding the hinging flexible canvas pan 18 to the alternative angular frame section 13" of the pan 12, which may be seen in FIG. 9 and by broken lines in FIG. 1. It is to be understood that other fingers 111 such as that shown in FIG. 14 may be mounted around other rods 14 and spacing members 16 elsewhere such as shown at the rear of pan 12 in FIG. 9, where the sheet metal member 21 is designed to give lateral rigidity to the attached conduit 9 as well as to restrict the space for flow of air around the cotton plants in entering the suction chamber beneath the manifold hood 2.

FIG. 15 is a vertical cross section at line 15C—15C' in FIG. 5 at right angles through one of the diagonally disposed angular cross section frame members 8-2 that extend across the tops of the cotton rows beneath the manifold suction hood 2. It shows a means of attaching to the frame members 8-1, 8-2, and 8-3 an angular bracket 113' for holding multiple similar coil springs 112 in a somewhat vertical position near the crests of the cotton plants 1 in FIG. 1. This arrangement will give great flexibility to the tip of the spring 112, having a slight enlargement on the end thereof, which drags through the top branches of the cotton plants and as an obstruction in the suction chamber serves to loosen any seed-cotton without doing appreciable injury to the leaves or unmatured bolls that have not opened. The springs 112 act somewhat like the chains 100' depending from the framework 8 as obstructions in the suction chambers; but the springs may form a phalanx alternately to pull the cotton to the side somewhat more than will the chains actuated by gravity. The same spring mounting used with the vertical spring finger 112 in FIGURE 15 of course may be used with a horizontal finger 111 as illustrated in FIG. 13 in which the coil spring 111 is attached to a square cross section spacing member 16 that is kept from rotating by the angle cross section horizontal frame member 13', also shown in FIG. 9.

An alternative flexible finger arrangement for loosening seed-cotton from the burrs to be carried away by the air in the suction chambers astride the rows to the fans and basket through suitable conduits is shown in FIG. 16, which shows a vertical cross section through a diagonally disposed horizontal frame member 8-1 of the front horizontal framework 8 at the line 16C—16C' of FIG. 5 across a cotton row, but which of course might be visualized as taking the place of one of the horizontal fingers 111 in FIG. 1 and FIG. 9. FIG. 16 illustrates a spiraling coiled spring 114 having a straight section near one end (shown in cross section) that extends through a soft metal tube 116 rigidly held in the center of a threaded plug 115 screwed into the angular frame member 8-1 through a reinforcing annular section 8A. The straight section of the spring 114 is rotatable in the tube 116 and is held therein by an annular washer 117 as a result of forming of the spring tip at right angles to the straight section after placement of the washer 117. A conventional means of lubricating the spring 114 and washer 117 with grease under pressure is indicated by 118; and retaining sections 8B (also serving as frame braces) may be welded in the angle of the frame member such as 8-1 on two sides of the plug 115 to insure that all grease inserted through 118 eventually will lubricate by gravity the spring 114 in the tube 116. As the spring 114 (of suitable diameter with coils of suitable length and diameter) drags through the limbs and foliage of the cotton plants, it will rotate automatically (without necessity of power actuated means) and in so doing will cause the coils to come in contact with the seed-cotton of open bolls. There also is a tendency to pull the seed-cotton directly from any burrs in the path of the "finger" 114 in addition to the rotation comparable to a "spindle." The spring 114 disposed at such an angle to the line of movement of the tractor will weave in and out of the cotton plant branches without injury to itself or the cotton plant; but it has sufficient strength and rigidity to pull the fully matured seed-cotton from the burrs. In the process of rotation among the plant limbs, the seed-cotton soon frees itself from the long coils of the spring and is drawn away toward the ascending air conduit inlets 11 contiguous to pans 12 astride the cotton row by the suction of the air within the suction chamber beneath the manifold suction hood 2. The most important advantage of such self rotating flexible fingers in conjunction with the air suction in the bottom slotted chamber is that the harvester is very selective, harvests no seed-cotton that is immature and should not be harvested, and does no injury to unmatured bolls. It will be appreciated that such self rotating coiled spring fingers as indicated by spring 114 in FIG. 16, where such a coiled spring is rotatably attached to a horizontal angular cross section frame 8-1, similarly might be attached to a vertically disposed square cross section spacing member 16 such as has been shown in FIG. 13 for mounting a horizontally disposed spring finger 111 that does not rotate in the same manner.

I claim:

1. A harvester mounted on wheels and containing: a semi-closed suction chamber having air-tight side-walls and connecting ceiling astride the row being harvested by passage of said suction chamber having partially open ends and bottom for passage of any plants being harvested; substantially horizontal and rigid pans suspended beneath the side-walls in close proximity to the lower edges thereof and extending inward toward such plants a short distance, thereby partially closing the bottom of the suction chamber astride the plants and providing a container for very temporarily collecting particles of the crop being harvested; ascending air suction conduits in communication with the suction chamber through the space between the pans and the side-walls above the pans, whereby the particles of the crop being harvested are drawn continuously to the source of suction by the same air which has drawn the crop particles away from the plant by virtue of passage of a very large volume of air at high speed caused by the fact that the ends and bottom of the suction chamber are somewhat obstructed, thus causing high speed of the air momentarily on entrance into the said suction chamber.

2. A cotton harvester specified in claim 1 containing the following means of partially obstructing air flow into the inverted U-shaped suction chamber: rather rigid plates attached in a substantially air-tight way to the pans, the ceiling, and the somewhat vertical walls of the air conduits and extending toward the plant row from the conduits several inches, approximating the extension distance inward toward the plants of the somewhat horizontal pans at the bottom thereof; a vertical curtain diagonally disposed across the plant row and contiguous to the rigid obstructing plates at the front of the suction chamber; horizontally disposed frames connected to the longitudinal sides of the pans adjacent the plant row but several inches therefrom; flexible, substantially air-tight curtains swingably attached at one longitudinal side to the horizontal frames and thereby to the pans along the edges thereof adjacent to the plant row, said curtains depending from the frames and pan edges a distance toward the ground approximating the distance from the pan edge to the plant row so that under suction the lower edges swing up under the plant limbs toward the plant stalks, weights being provided on the lower edges of the flexible curtains keeping the curtains beneath the limbs directly under the suction chamber and pulling the inner front corners of the flexible curtains downward somewhat more in an area of less intense suction, thereby forming flexible mouldboards to insure that all limbs initially are drawn up above the curtains toward the ceiling of the suction chamber; and a quite flexible bottom-slotted tubular trailing skirt whose forward edge is attached in a substantially air-tight manner at the rear end of the suction chamber to the ceiling thereof, to the air obstructing plates extending inward toward the plant row from the suction conduits, and to the rear edges of the flexible curtains whose longitudinal edges are attached to the sides of the somewhat rigid pans, suitable suction resisting weights being attached near the bottom-slotted edges of the trailing tubular skirt, which otherwise constitute rearward extensions of the flexible curtains depending from the essentially rigid pans beneath the suction chamber, and means being provided sustaining the flexible skirt above the ground when no plants are in the rows and when the harvester is reversing and turning.

3. A harvester specified in claim 1 in which the ascending conduit on one side of the suction chamber is positioned further forward as a whole than a substantial part of the ascending conduit on the other side of the row, and in which the conduits on both sides of the suction chamber merge into a larger single conduit directly above the suction chamber, said single conduit connected with the ascending conduits at the sides of the row having an outlet at the rear thereof, directly over the row being harvested, into a large conduit leading backward directly over the row into the inlet of a case housing a rotating fan, driven by the power-take-off shaft at the rear center of the body of a tractor, having a steering truck beneath the forward portion thereof, on which the harvester is mounted.

4. A harvester unit specified in claim 3 in which the forward placed ascending conduit described is merged with a similar forwardly placed conduit of another inversely corresponding harvester unit on the opposite side of the tractor body, the larger merging single conduits above the paired suction chambers combining to form a hood over both rows that extends loosely around the front end of the tractor body ahead of the steering truck in the general form of a horizontal U, and in which parallel conduits of large cross sectional area directly over the rows being harvested lead back between the rear wheels and body of the tractor to forward directed inlets in inversely corresponding cases, in which are mounted contra-rotating fans driven from the same power-take-off shaft at the rear center of the tractor body and discharging their air with its crop burden into a suitable retainer substantially over the rear drive wheels of the two-row tractor spaced over the two rows.

5. A primarily pneumatic harvesting mechanism consisting of machine including a power-actuated rotating fan in a case sucking air through an inlet to the case from a large almost horizontal conduit, directly over the row being harvested and parallel thereto but continually sloping upward slightly from front to rear ends thereof, that diverges substantially horizontally at its front section into multiple smaller conduits on both sides of the row from which the crop is harvested, said smaller conduits extending downward and being in communication with a semi-closed suction chamber, mounted on a normally horizontal frame section beneath the diverging conduit and adjustable vertically relative to the ground by hydraulic means at the disposal of a conventional tractor operator, astride said row and having the general lateral cross-section shape of an inverted U with substantially horizontal and rigid metal pans suspended from the ends of some of the walls of each of said smaller conduits normally about a foot from the ground and extending inward about half the distance toward the row, the ends of the suction chamber being closed by substantially air-tight attachment of metal plates between the pans and the ceiling from the sidewalls of the chamber to the edges adjacent the harvested row of the pans, also supported at those edges by rods depending from the framework beneath the suction chamber ceiling and to some extent obstructing plant limbs drawn toward the air inlets of the smaller suction conduits, with the remaining area astride the plant row and between the substantially horizontal bottom pans being closed very largely under air-suction by flexible curtain-pan segments of air-tight material such as heavy canvas attached at the sides of the rigid pans adjacent the said row and having their lower edges weighted, particularly at the front corners, thereby keeping the flexible curtain-pan segments beneath the limbs of plants in the row, the rear ends of the said curtain-pans merging into the lower segments of a bottom-slotted substantially horizontal trailing flexible tube attached at its front to the rear walls and ceiling of the suction chamber, all air inlets from the suction chamber to the ascending smaller conduits on each side of the row being directly contiguous to the rigid pans and at least one wall of each of said smaller conduits being in contact with said rigid pans at the lower end thereof, and each of said smaller ascending air side-conduits affording at least one continually sloping surface therein at an angle from the vertical up which the air under suction tumbles its burden of seed-cotton, occasional boll burrs, half-opened knotty bolls etc without having to lift said burden vertically entirely by air suction, the suction chamber and its attached substantially rigid conduits remaining in substantially fixed position relative to the suction fan case with all of these members rigidly mounted on a single master framework, whose parts are rigidly connected and reinforced by trusses, none of the interconnecting conduits being freely telescoping and none of them being of a variety generally called flexible.

6. A cotton harvesting machine installed without alteration on a conventional tricycle two-row crop cultivating tractor moving at its normal forward speeds and having a long body under whose front end is a steering truck and whose rear end is supported by axle housings, protruding laterally from the rear sides of the body, in which are axles mounting drive wheels and rubber tires spaced equally from said body and about 70 inches from each other, said harvesting machine comprising: pivotal brackets, spaced from said body and attached to the tractor axle housings loosely by U-bolts, mounting a generally rectangular framework around the tractor body in spaced relationship thereto over the axle housings, the rectangular framework consisting of a mid-section composed of parallel spliced angle cross-section frames over the cotton rows and sloping upward slightly from front to back, a normally horizontal front section extending around the front of the tractor body just above the cotton plants, and a normally horizontal rear transverse section on which are mounted a pair of very large contra-rotating suction fans on axles parallel to the longitudinal axis of the tractor and discharging their air and its burden of seed-cotton upward in a converging air-stream between them in suitable housings surrounded in supporting contact by vertical frames, that also support a suitable seed-cotton retainer directly over the mid-point of the rear axle housings of the tractor above the operator's head, and that reinforce the front and mid-sections of the rectangular frame by adjustable trusses, connecting the vertical frames to the front section of the generally rectangular framework on each side of the tractor body; a pair of semi-closed suction chambers astride the two cotton rows on each side of the steering truck and joined in front of the tractor body and resting on the front section of the rectangular frame, which is attached by a suitable linkage to the hydraulic lift mechanism of the conventional tractor, and are raised and lowered, just as the cultivating implements would be raised and lowered except that the fans and their cases counterbalance the suction chambers on the lateral axis of the rectangular frame pivotally mounted over the rear wheel axle housings, the fan cases rearward of the tractor drive wheels being connected to the suction chambers on the same rigid rectangular framework by substantially non-flexible suction conduits, which rest on the parallel spliced mid-section frames between the rear wheels and the tractor body and diverge horizontally at their front and join the suction chambers on each side of the two rows with the suction inlets of the conduits into the suction chambers as well as the walls of the suction chambers between the two harvesting cotton rows and ahead of the tractor body being substantially forward of the suction inlets and suction chamber walls outside those two rows and beside the tractor trucks ahead of the widely spaced drive wheels; and means rotating the large suction fans consisting of a flexible shaft connection, including two splined universal joints and a linear expansion joint, between the power-take-off shaft at the rear center of the conventional tractor and a normally substantially parallel shaft in line therewith in a gear transmission box below the merging air outlet between the two fan cases and below the transverse members of the rear framework supporting them, suitable gears and shafts mounted within the box on parallel axes in a conventional manner whereby two sheaves driving pulleys on shafts projecting from the rear of the box turn in opposite directions, and endless V-belts carried by the driving sprockets and driving other sheaved pulleys installed immediately rearward of the paired fan cases on the rearward protruding fan axles, which are mounted on suitable frames outside the fan cases and in paired bearings with the front bearings immediately adjacent the centers of the fan case inlets, to which the large parallel and longitudinal suction conduits are connected, the gear box beneath the fan cases being attached to the transverse rear frame members by vertically slotted brackets attached to the gear box and clamped to the angle cross-section frames by bolts extending through the slots, which thus adjust the tension of the V-belts driving the paired fans.

7. A primarily pneumatic harvesting mechanism incorporating a semiclosed air suction chamber, having a widely slotted bottom and end walls permitting passage of plants therethrough, in which are multiple individually flexible fingers mounted above and at each side of the plant row with loose ends of the said fingers projecting toward the plant row above the slotted bottom of the chamber and passing between the limbs of the plants, which are swayed from side to side by said projecting fingers, some of which are staggered relative to other such fingers on the opposite side of the row, each of said fingers having attached to its free end an enlargement that trails between the limbs of each cotton plant, as the suction chamber passes along the row of plants, thereby fingering and thus tending to loosen any seed-cotton lint projecting from the boll burrs and thus, by increasing the area of the lint on which the air under suction acts, aiding the air in sucking the seed-cotton loose from the plant boll burrs in situ, such seed-cotton thereafter traveling under some suction to an outlet from the said suction chamber forming the inlet of one of multiple suction conduits leading from each side of the plant row to the case housing a power-actuated rotating fan, which discharges the combined air and seed-cotton into a part-mesh retaining basket for the seed-cotton.

8. A harvesting mechanism specified in claim 7 except that, instead of "each of said fingers having attached to its free end an enlargement," some fingers made of spring steel have a straight segment rotatably mounted in a framework adjacent to the slotted passageway, said straight segment constituting a pivoting portion of a free trailing spiraled coil, whereby the spring finger becomes auto-rotational on being drawn through the limbs and foilage of the cotton plant.

9. A primarily pneumatic harvesting machine comprising: dual large power-actuated rotating fans, mounted on spaced axles parallel to the linear axis of a conventional tricycle row-crop cultivating tractor in a single joined enveloping case back of the rear drive wheels and supported by a transverse framework attached to two parallel linear primary frames, in line with the tractor linear axis, pivotally mounted on a horizontal lateral axis over the rear wheel axle housings of the tractor, that suck air from a pair of large longitudinally disposed conduits at each side of the tractor body and connected at their front ends with corresponding openings from a hollow polyhedron box formed in a horizontal U-shape around the forward portion of the rather narrow forward extending tractor body, relative to which the box is spaced slightly and is movable vertically by means of the conventional tractor hydraulic system, said box having an overall width corresponding roughly to the widely spaced rear drive wheels of the tractor spanning two rows and having its forward lateral section of the U flattened out sufficiently in front of the tractor radiation that the fan of the tractor behind the radiator draws air through said radiator without obstruction to said air passage and that vision of the tractor operator in his conventional seat is not obscured; coordinate semi-vacuum suction chambers, beneath the hollow polyhedron box and ahead of all the tractor wheels, having slotted ends and sloted floors astride the two rows being harvested; and air suction conduits depending from the floor of the polyhedron box between the two adjacent harvesting rows of plants to the various segments of the slotted floors at at least one point around the conduit inlet, thereby sucking the seed-cotton and other crop being harvested through the depending conduits, through the hollow polyhedron box wose bottom forms the tops of the suction chambers, through the large pair of parallel almost horizontal conduits sloping upward toward the rear, and into the case that houses the dual fans, each of the suction conduits depending from the polyhedron box having at least one surface sloping continuously from the vertical, up which the air burden is tumbled without necessity of direct vertical lift by air suction.

10. A harvesting machine specified in claim 9 in which the hollow polyhedron box rests on a substantially horizontal web framework constructed for the most part of metal members having an angle cross section, with the angle downward, disposed across the tops of the plants being harvested at such angles to the line of movement of the harvester that any plant tops touching the framework members so disposed are moved back and forth laterally beneath the box to some extent, as the machine moves down the row, and in which lengths of rather heavy chains are suspended from said diagonally disposed framework members above the cotton plants, the chains being of such length that the depending chains separate the limbs and foliage of the cotton stalks to some extent as well as agitate any seed-cotton with which they and the air under suction come in contact.

11. A crop harvesting machine having a pair of power-actuated contra-rotating fans, having axes parallel to the longitudinal axis of the conventional two-row spanning row-crop cultivating tractor, on which they are transported, mounted in bearings in a suitable framework in a dual case having forward air inlets so spaced laterally that they accommodate large parallel longitudinal conduits at each side of the tractor between its narrow body and the widely spaced tires on the rear drive wheels of the tractor, said conduits continually sloping upward slightly from front to rear toward the air inlets of the fan cases, to which they are brought in substantially airtight contact around the air inlets, and having lateral square dimensions such that they fill substantially all the space between the tractor body and drive wheel tires, a generally rectangular almost horizontal master framework mounted on lateral projections from the tractor body near its rear end enclosing the axles of the drive wheels supporting the fan cases on a lateral segment of the master framework rearward of the drive wheel tires, shafts substantially parallel to the longitudinal axis of the tractor rotating in bearings of a gear-box mounting below the fan cases and suspended from the said lateral segment of the framework, the mounting being adjustable in position vertically relative to the fan cases above and to the shafts on which the fans are mounted, a flexible shaft connection including multiple splined universal joints and a linear expansion joint between the conventional power-take-off shaft, at the rear center line of the tractor, and one of the shafts in the rearwardly spaced gear box substantially in line with the power-take-off shaft and equidistantly spaced from the axles on which the fans rotate in their cases, said shaft extension mounting a gear in the gear-box in mesh with other gears on two adjacent shafts whereby in a conventional manner the adjacent shafts are turned in opposite directions, the ends of said adjacent shafts protruding from the rear wall of the box and mounting V-belt driving pulleys, in which are carried endless V-belts that similarly rotate in opposite directions other slightly smaller V-belt pulleys mounted on the respective fan axles protruding rearward from the fan cases and rear bearings of the fans in frames enclosing the fan cases and supporting the fans.

12. A drop harvesting machine specified in claim 11 in which are provided parallel vertical conduits, having at their upper ends suitable horizontally slidable gates for closure as desired by the operator sitting on a seat on the tractor body slightly forward of them, located immediately forward of the dual-inlet fan case and directly over the respective large parallel and almost horizontal air conduits leading to said fan case inlets surrounding the fan axes at their approximate centers, openings being provided in the tops of the parallel large conduits, disposed at each side of the tractor body, for connection with the parallel vertical conduits, whereby the crop retained temporarily in a suitable basket overhead may be diverted down into the large almost horizontal conduits from the basket for a second aeration in passing through the contra-rotating suction fans.

13. A pair of inversely designed right and left units joined around the front end of a tractor on a single horizontal framework, each of which comprises a primarily pneumatic cotton harvesting mechanism sucking seed-cotton from the boll burrs on the plants in situ in the row and consisting of a power actuated rotary fan in a case sucking air into the case inlet through a straight forward extending conduit, which slopes downward continuously from back to front, and which thence diverges horizontally above the harvested row and thereafter sucks air on each side of the row through separated inlets from a semi-closed suction chamber astride the row in the general nature of an inverted U-shaped shell of sheet metal, whose air-tight side-walls and ceiling are augmented by the following substantially air-tight connected means restricting flow of air into the suction chamber around the plants in the row: (1) substantially horizontal sheet metal pans throughout the length of each side-wall extending inward about half the lateral distance from the sidewall toward the longitudinal median plane in which the plant row passes through the suction chamber, the suction chamber being supported on a vertically adjustable framework extended beneath its ceiling from the rear at a height making the metal horizontal pans, at the bottom of the suction chamber and in the same plane on each side of the plant row, stand normally about one foot from the ground; (2) generally rectangular long curtain pans of flexible but substantially air-tight woven material such as heavy cotton canvas attached at one side thereof to the sides of the horizontal metal pans adjacent the plant rows being harvested, each of the curtain-pans being in width about half the distance between the two said horizontal metal pans astride the row and effecting substantial closure of the bottom of the suction chamber around the plant stalks below the plant limbs, weights being attached to the free longitudinal margins of the curtain-pans and keeping the flexible material under some tension even when drawn toward the plant stalks by air suction from the suction chamber, one weight in particular being attached to the free margin of each curtain-pan adjacent its front end, whose lower corner, under somewhat less suction by virtue of entrance of air into the suction chamber from its front, droops down slightly more than the remainder thereof under the suction chamber and forms a flexible deflecting surface directing the tips of some plant limbs upward and toward the longitudinal median plane of the suction chamber; (3) front and rear end-plates on each side of the row, of substantially the same width as the horizontal pans, attached at bottom and top to said pans and to the ceiling of the suction chamber as well as to its sidewalls, the front end-plates in particular being disposed at suitable oblique angles to the line of travel of the harvester and to the plant row beneath the suction chamber, whereby the front end-plates entirely from top to bottom tend to direct wide-spreading plant limbs into the space between said end-plates and thence into the suction chamber, although the end-plate on one side of the plant row is staggered well ahead of that on the opposite side of said row; (4) vertical curtains of flexible and substantially air-impervious material, such as heavy cotton canvas, depending from a crooked horizontal frame, whose shape conforms to the staggered oblique front end-plates and to the ceiling of the suction chamber between them, the outer vertical edges of the vertical depending curtains being drawn snugly against the metal end-plates by air suction, and the inner vertical edges of the curtains midway between the end-plates providing a vertical slot (of adjustable length from the ground) ahead of the suction chamber and directly over the space reserved for passage of the plant row between the said curtains and through the suction chamber, the slot between the curtains being yielding for passage of very large tilted cotton plants all the way up to the frame supporting the ceiling of the suction chamber, to which the crooked horizontal curtain frame is bolted, thereby making the vertical curtains hang slightly ahead of the points at which the front ends of the lower somewhat horizontal flexible curtain-pans are attached to their respective horizontal metal pans, the vertical front curtains thus operating to seal out air, regardless of their possible length and even though extending below the end-plates attached to said metal pans, ahead of the front ends of the somewhat horizontal flexible curtain-pans (below the suction chamber), against which unusually long vertical front curtains would be drawn without conflict by air suction; and (5) a substantially horizontally disposed trailing skirt of flexible substantially air-tight woven material, such as heavy cotton canvas, attached in an air-tight manner to the ceiling and rear end-plates of the suction chamber and forming an auxiliary flexible extension thereof astride the cotton row in the shape of an inverted U at its rear end, which is suitably hung beneath rearward extensions of the framework, with the lower edges of the inverted U-shaped skirt extending forward beneath the metal suction chamber as the lower edges of the flexible curtain pans, attached at their longitudinal upper edges to the horizontal metal pans, the rear ends of the longitudinal curtain-pans beneath the suction chamber being attached to the front edges of the trailing inverted U-shaped skirt adjacent said lower edges on each side of the row as integral forward extending parts of the skirt, thus leaving a predominantly horizontal (except for slight lowering under weights at the front and rear ends) slot of automatically adjusting width between the curtains of substantially air-tight material for passage of the cotton plant stalks from the front of the suction chamber proper to the rear of the trailing inverted U-shaped skirt, whose forward end at the rear of the said suction chamber proper forms a bottom-slotted flexible horizontally disposed somewhat rectangular in cross-section tubular member.

14. A primarily pneumatic cotton harvesting machine, sucking seed-cotton from the boll burrs on the plants in situ in the field rows, mounted on a row-crop cultivating tractor moving in its normal forward cultivating gears in the harvesting operation and having a long narrow body (incorporating its engine), whose front end in all operations is supported by the same unaltered steering truck below it and guided by a man seated in the same operator's seat on top of the body at the rear portion thereof, and whose rear end is supported by tubular axle housings, projecting laterally from each side of the body adjacent said rear end, from the outside ends of which protrude driving axles on which are mounted large wheels having pneumatic tires widely spaced from the narrow body and spanning two adjacent plant rows with their center treads approximately at the middles outside those two plant rows, said harvesting machine comprising: (1) a normally horizontal lateral framework disposed above the two adjacent plant rows in the general shape of a horizontal U extending around the front of the tractor body in spaced relationship thereto sufficient for its slight vertical movement (relative to the tractor body at the election of the operator) of the framework, which is composed in large part of metal grid members having V cross sections and disposed at alternate oblique angles relative to the plant rows, whereby the tops of any plants touching the oblique grid members are swayed from side to side; (2) a pair of semi-closed suction chambers, extending around the steering truck of the tractor in a similar general horizontal U shape, whose ceilings rest on the obliquely disposed horizontal grid framework members, and whose air-tight sidewalls, parallel to the plant rows, extend down below the horizontal framework in the middles between the plant rows from the ceiling, to which they are attached in an air-tight manner, and thereby form inverted substantially U-shaped shells astride the plant rows, around which the air under suction is restricted partially by substantially horizontal metal pans attached to the sidewalls throughout the lengths of their bottom edges and extending inward therefrom toward the plant rows about halfway and by vertical end-plates, of the same width at the bottom as the horizontal pans, to which they are attached in an air-tight manner as well as to the ceiling and sidewalls of each suction chamber, the horizontal pans being supported in part along their margins adjacent the plant rows by vertical rods depending from the normally horizontal framework beneath the suction chamber ceilings, from which air is sucked through holes on each of the two plant rows, the holes leading from the suction chambers above and between the two plant rows being located somewhat forward of those outside said two plant rows and thereby causing the plants to be drawn toward first one side and then the other of each suction chamber; (3) a pair of strong rigid parallel frames having V-shaped cross sections attached rigidly to the normally horizontal U-shaped framework at its rear and behind the suction chambers on each side of the tractor body above the plant rows and extending rearward at a slight upward incline above said plant rows and over the tubular housings of the rear axles, where they rest in and are bolted to larger rigid splicing parallel frames of similar V-shaped cross section that extend forward and slope downward at the same slight angle from a rear lateral framework (even rearward of the large tractor drive wheel tires) on which is mounted a joint fan case, whose front vertical and lateral wall has a pair of air-admitting spaced orifices directly above the plant rows and leading to the contained contra-rotating fans therein from very large and continuously upward sloping square-cross-section air suction conduits, which rest on the parallel spliced frames and fill substantially all the space above the rear axle housings between the tractor body and the rear wheel tires, in front of which each of the large conduits diverges horizontally and connects with the holes (on each side of the plant rows) from which air is sucked from the suction chambers ahead of each of the tractor wheel tires; (4) vertical frames, rigidly mounted on the rear lateral fan-case-supporting framework, in front of and behind the fan case, which support the bearings of the rotating fans in the case on horizontal connecting members, and which also support a horizontal framework below a retaining basket of the harvested seed-cotton above the operator's head, and which are connected by means of suitable trusses (bolted to the front of said horizontal supporting framework) to the previously mentioned front lateral framework on which the suction chambers are carried, thereby keeping the fan case in a fixed position relative to the suction chambers; (5) V-belt pulleys mounted on parallel fan shafts, protruding rearward horizontally above the plant rows from snug holes in the rear vertical wall of the joined fan cases and through the fan bearings, and driven by means of continuous V-belts carried by sheaves of driving pulleys mounted on two parallel rotatable horizontal shafts projecting rearward from a transmission gear-box housing (disposed beneath the joined fan cases and their lateral supporting framework, to which it is attached in a vertically adjustable mounting, substantially in line behind but a considerable distance from the tractor's power-take-off shaft, projecting rearward in the vertical longitudinal center plane of the tractor body), gears on the two said parallel shafts driven in opposite directions by a gear on one of two parallel gear shafts between them, which protrudes forward from a snug hole in the front wall of the gear box and which normally is in line with the tractor power-take-off shaft, which rotates the forward projecting shaft, that is mounted in the gear box in suitable bearings corresponding to those of the other three parallel shafts, by means of an intermediate flexible shaft connection having a linear expansion joint in addition to a universal joint at each end therof provided with suitable splines and grooves corresponding to those at the ends of the power-take-off shaft and the shaft projecting forward from the gear box; and (6) means rocking the entire spliced and assembled framework from front to back of the harvester longitudinally on a horizontal lateral axis over the rear driving axle tubular housings, thereby raising and lowering the suction chambers relative to the front of the tractor body and its supporting steering trucks on the ground between the rows without altering the position of the suction chambers in front of the tractor wheels relative to the fan cases behind the tractor wheels and thus without requiring any flexibility in the air suction conduits conecting the said suction chambers to the air inlets of the very large joint fan case (substantially as wide as the two-row spanning rear tires) behind the tractor operator's seat above the tractor body between the very large air suction conduits between the rear drive wheels, said rocking means being the equivalent of the following: (a) suitable brackets, on each side of the tractor body, bolted to the rear axle tubular housings by U-bolts loosely enveloping said housings and attached rigidly to the bottoms of the two lowermost of the previously mentioned rigid parallel longitudinally disposed sloping frames, whose V cross sections facilitate splicing assembly on the tractor of the rigid front and rear frame longitudinal projections, which are bolted together and thereby form a central linking framework astride the tractor body in conjunction with vertical supports at the front ends of the horizontal frame members beneath the seed-cotton retaining basket that link the fan-case enveloping vertical frames to the trusses from the lateral frame in front of the tractor body; (b) spacing members installed on each side of the tractor body precisely limiting lateral movement of the brackets relative to the tubular housings but permitting slight longitudinal rocking of the brackets on the said housings as a lateral horizontal axis; and (c) vertical linkages between the normally horizontal framework, supporting the suction chambers on each side of the tractor body, and hydraulically actuated bell cranks on the tractor, whereby the tractor operator otherwise would raise and lower cultivating implements relative to the ground on which it rolls, the fans and fan cases on the rear platform counterbalancing the suction chambers on the front horizontal U-shaped framework over the longitudinal frame brackets supported pivotally by the rear axle tubular housings of the tractor with the center of gravity of the cargo in the seed-cotton retaining basket being located approximately over the midpoint between the two rear drive wheel axles of the tractor, so that the small hydraulic control mechanism, designed for lifting the cultivating implements enjoying no such counterbalancing on the tractor, adequately controls the tilt of the entire harvesting mechanism framework regardless of the amount of seed-cotton in the retaining basket.

References Cited in the file of this patent

UNITED STATES PATENTS

| | | |
|---|---|---|
| 685,111 | Dannelly | Oct. 22, 1901 |
| 1,041,650 | McComb | Oct. 15, 1912 |
| 1,107,908 | Cunningham | Aug. 18, 1914 |
| 1,501,334 | Hanson | July 15, 1924 |
| 1,711,316 | Higgins | Apr. 30, 1929 |
| 2,234,599 | Johnston | Mar. 11, 1941 |
| 2,440,770 | Hagen | May 4, 1948 |
| 2,520,927 | Hagen | Sept. 5, 1950 |
| 2,650,462 | Skaggs | Sept. 1, 1953 |
| 2,673,436 | Urban | Mar. 30, 1954 |
| 2,678,504 | Knopp | May 18, 1954 |
| 2,696,677 | Molenaar | Dec. 14, 1954 |
| 2,697,005 | Hagen et al. | Dec. 14, 1954 |